United States Patent
Nagai et al.

(10) Patent No.: US 6,956,754 B2
(45) Date of Patent: *Oct. 18, 2005

(54) SWITCHING POWER SUPPLY USING CONTROLLED NEGATIVE FEEDBACK IN SERIES WITH A SWITCHING DEVICE AND RESPONSIVE TO THE VOLTAGE AND/OR CURRENT TO A LOAD

(75) Inventors: Tamiji Nagai, Kanagawa (JP); Tamon Ikeda, Tokyo (JP); Kazuo Yamazaki, Kanagawa (JP)

(73) Assignee: Sony Corporation, (JP)

( * ) Notice: Subject to any disclaimer, the term of this patent is extended or adjusted under 35 U.S.C. 154(b) by 16 days.

This patent is subject to a terminal disclaimer.

(21) Appl. No.: 11/097,130

(22) Filed: Apr. 4, 2005

(65) Prior Publication Data

US 2005/0169023 A1    Aug. 4, 2005

Related U.S. Application Data

(63) Continuation of application No. 10/470,088, filed as application No. PCT/JP02/12432 on Nov. 28, 2002.

(30) Foreign Application Priority Data

Dec. 5, 2001    (JP)    .......................... P2001-371661

(51) Int. Cl.[7] ............................................ H02M 3/335
(52) U.S. Cl. ..................... 363/97; 363/21.01
(58) Field of Search ............... 363/20, 21.01, 363/97

(56) References Cited

U.S. PATENT DOCUMENTS

| | | | | |
|---|---|---|---|---|
| 6,088,244 A | * | 7/2000 | Shioya et al. ............. | 363/21.07 |
| 6,226,190 B1 | * | 5/2001 | Balakrishnan et al. ... | 363/21.13 |
| 6,366,479 B1 | * | 4/2002 | Usui et al. ................ | 363/21.12 |
| 6,711,035 B2 | * | 3/2004 | Tomioka ................... | 363/21.06 |
| 6,714,425 B2 | * | 3/2004 | Yamada et al. ........... | 363/21.12 |

FOREIGN PATENT DOCUMENTS

| | | |
|---|---|---|
| JP | 8-340673 A1 | 12/1996 |
| JP | 2000-209850 A1 | 7/2000 |
| JP | 2001-197741 A1 | 7/2001 |

\* cited by examiner

*Primary Examiner*—Jeffrey Sterett
(74) *Attorney, Agent, or Firm*—Rader, Fishman & Grauer, PLLC; Ronald P. Kananen

(57) ABSTRACT

A commercially available power source is rectified by a diode bridge and a capacitor and supplied to a transformer via a terminal. One end of a primary coil is connected to the terminal and the other end is connected to a switching device. One end of a feedback coil is connected to the switching device and the other end is connected to the terminal. A negative feedback circuit is provided between the switching device and the terminal. A rectifying circuit comprising a diode and a capacitor is provided on a secondary coil. A node of the coil and the capacitor is connected to the terminal via a resistor. In detecting circuits, a voltage across the terminal is detected and a current across the resistor is detected. When the detected voltage and current are equal to predetermined values, a control signal is supplied to a feedback circuit.

2 Claims, 38 Drawing Sheets

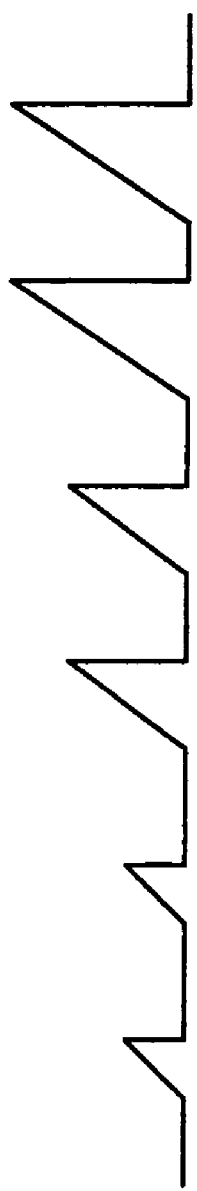
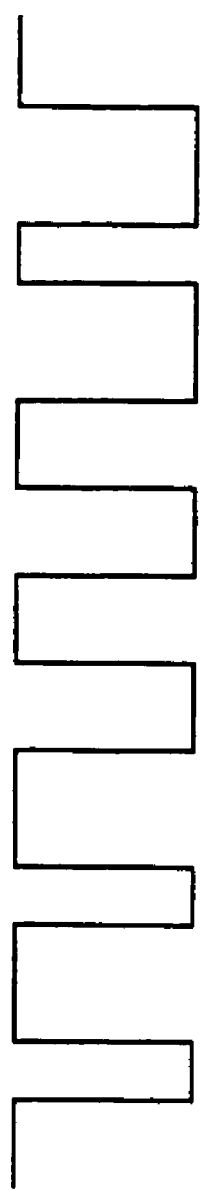
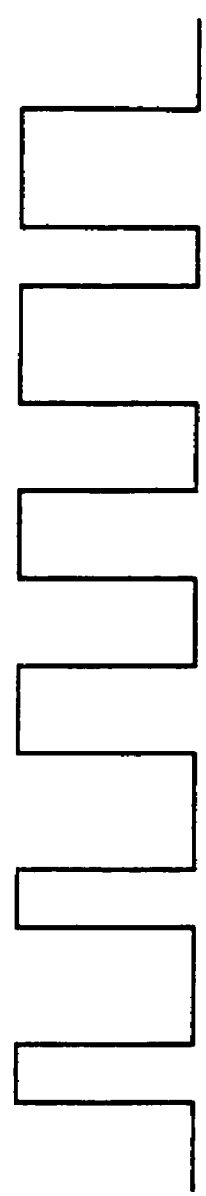
Fig. 41A
Fig. 41B
Fig. 41C

US 6,956,754 B2

SWITCHING POWER SUPPLY USING CONTROLLED NEGATIVE FEEDBACK IN SERIES WITH A SWITCHING DEVICE AND RESPONSIVE TO THE VOLTAGE AND/OR CURRENT TO A LOAD

This application is a continuation of prior application Ser. No. 10/470,088, filed Jul. 24, 2003, hereby incorporated in its entirety by reference, based on International Application No. PCT/JP02/12432, filed Nov. 28, 2002.

TECHNICAL FIELD

The invention relates to a switching power supply apparatus and a power control method which can output stable voltage and current even if a capacity of a load fluctuates.

BACKGROUND ART

Hitherto, for a switching power supply circuit, a separately-excited switching power supply system in which switching is made by an output of an OSC (Oscillator) and a self-excited switching power supply system which does not use the OSC are used. According to the self-excited switching power supply system, although it can be constructed at a lower cost than the separately-excited switching power supply system, when a load decreases, an oscillation phenomenon occurs inevitably.

In the self-excited switching power supply system, therefore, in order to suppress the oscillation phenomenon, the switching power supply circuit is designed to have only low efficiency. In other words, it cannot be designed so that high efficiency is obtained at the maximum load.

It is, therefore, an object of the invention to provide a switching power supply apparatus and a power control method in which even in the self-excited switching power supply system, a switching power supply circuit is designed so that the high efficiency operation is executed at the maximum load and, even if a capacity of a load fluctuates, a voltage and a current can be stably outputted.

DISCLOSURE OF INVENTION

According to a first aspect of the invention, there is provided a switching power supply apparatus for supplying a voltage and a current to a connected load, comprising: a transformer constructed by at least first, second, and third coils; detecting means for detecting a voltage and/or a current; a switching device for controlling the voltage and/or the current; negative feedback means for applying a negative feedback to the switching device; and control means for controlling an operation/stop of the negative feedback means, wherein the control means makes the negative feedback operative when the detecting means detects the voltage and/or the current in which it is possible to determine that a value of the load is equal to or less than a predetermined value.

According to another feature of the invention, there is provided a power control method for a switching power supply apparatus constructed by a transformer having at least first, second, and third coils, detecting means for detecting a voltage and/or a current, a switching device for controlling the voltage and/or the current, and negative feedback means for applying a negative feedback to the switching device, comprising the steps of: detecting the voltage and/or the current by the detecting means; discriminating whether the detected voltage and/or the detected current are/is values/a value for making the negative feedback means operative or stopping the operation or not; making the negative feedback means operative if it is determined that the detected voltage and/or the detected current are/is the values/value for making the negative feedback means operative; and stopping the operation of the negative feedback means if it is determined that the detected voltage and/or the detected current are/is the values/value for stopping the operation of the negative feedback means.

As mentioned above, according to the invention, the negative feedback means is provided for a self-excited switching power supply and only when the connected load is smaller than the predetermined value, a negative feedback resistance is varied so as to make the load means operative, so that the oscillation can be suppressed and even when the capacity of the load fluctuates, the stable voltage/current can be outputted.

BRIEF DESCRIPTION OF DRAWINGS

FIG. 41, consisting of FIGS. 41A, 41B, and 41C, is a characteristics diagram for explaining the fourth embodiment to which the invention is applied.

BEST MODE FOR CARRYING OUT THE INVENTION

Figure 1:
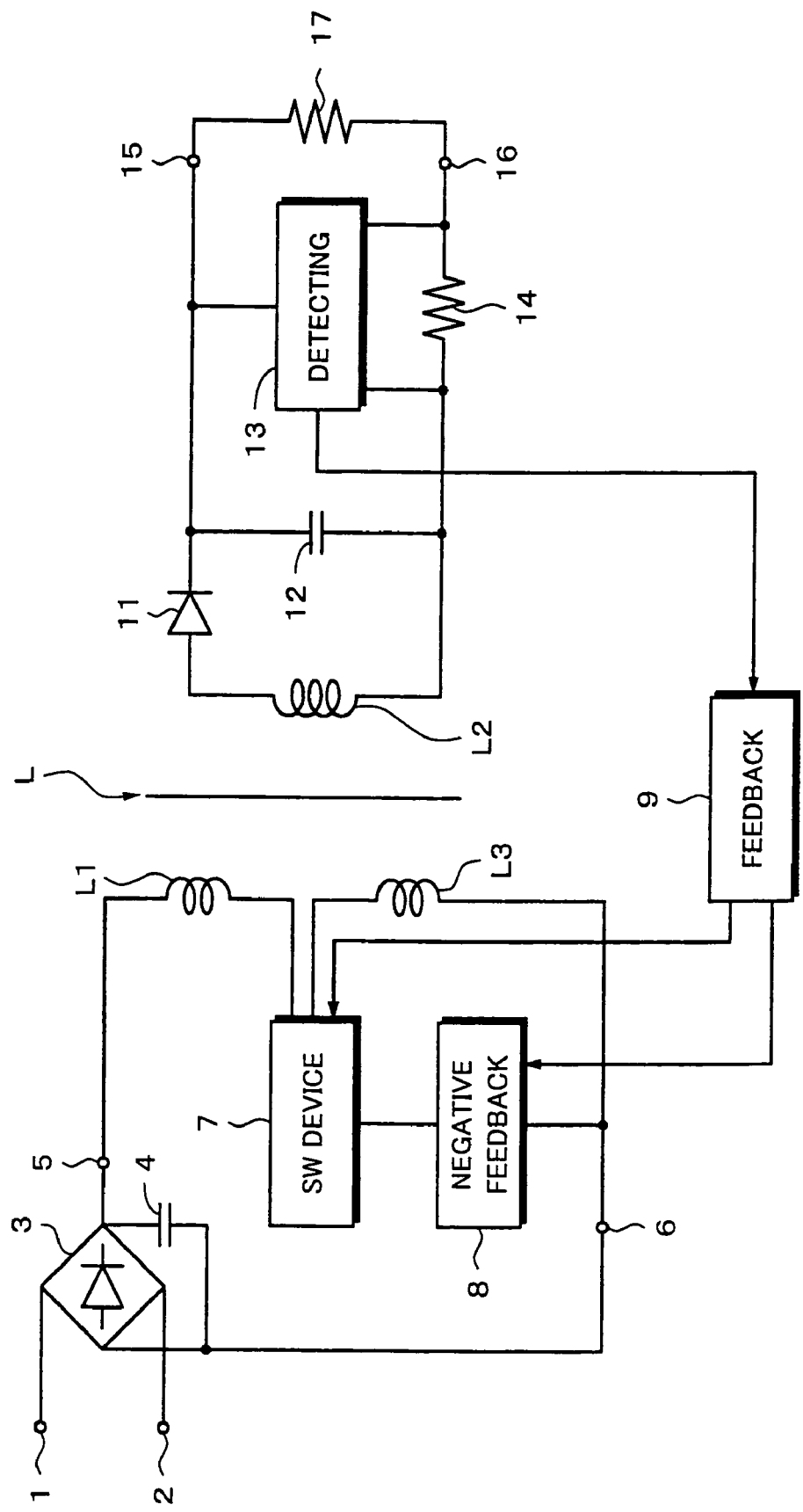
FIG. 1 is a block diagram for explaining a whole construction of the first embodiment of the invention.

An embodiment of the invention will be described hereinbelow with reference to the drawings. Component elements having the same functions in the drawings are designated by the same reference numerals, thereby avoiding their overlapped explanation. FIG. 1 shows a whole construction of the first embodiment to which the invention is applied.

A commercially available power source is supplied from input terminals 1 and 2. The supplied commercially available power source is rectified by a diode bridge 3 and a capacitor 4 and supplied to a transformer L via terminals 5 and 6. The transformer L is constructed by a primary coil L1, a secondary coil L2, and a feedback coil L3. One end of the primary coil L1 is connected to the terminal 5 and the other end is connected to a switching device 7. One end of the feedback coil L3 is connected to the switching device 7 and the other end is connected to the terminal 6. A negative feedback circuit 8 is provided between the switching device 7 and the terminal 6. The operation of each of the switching device 7 and the negative feedback circuit 8 is controlled by a feedback circuit 9.

A rectifying circuit comprising a diode 11 and a capacitor 12 is provided for the secondary coil L2. A cathode of the diode 11 is connected to a terminal 15. A node of the secondary coil L2 and the capacitor 12 is connected to a terminal 16 via a resistor 14. In a detecting circuit 13, a voltage across the terminals 15 and 16 is detected and a current across the resistor 14 is detected. If the detected voltage and current are equal to predetermined values, a control signal is supplied to the feedback circuit 9. The switching device 7 and the negative feedback circuit 8 are controlled by the control signal supplied to the feedback circuit 9. A load 17 such as an electronic apparatus or the like is connected to the terminals 15 and 16.

As mentioned above, control is made in a manner such that the outputted voltage and current are detected, the value (capacity) of the load is calculated from the detected voltage and current, and when the load is smaller than a predetermined value, the switching device 7 and/or the negative feedback circuit 8 are/is turned on/off.

The transformer L will now be described. A turn ratio of the primary coil L1 and the feedback coil L3 is set to L1<L3. A turn ratio of the primary coil L1 and the secondary coil L2 depends on a switching power frequency. The larger a difference between the primary coil L1 and the secondary coil L2 at the same electric power is, the lower the switching power frequency is. The smaller the difference between the primary coil L1 and the secondary coil L2 at the same electric power is, the higher the switching power frequency is. Therefore, it is necessary to select the optimum turn ratio so as to obtain high efficiency at the maximum load in accordance with conditions (characteristics) of the transformer L and the switching device 7.

Figure 2:
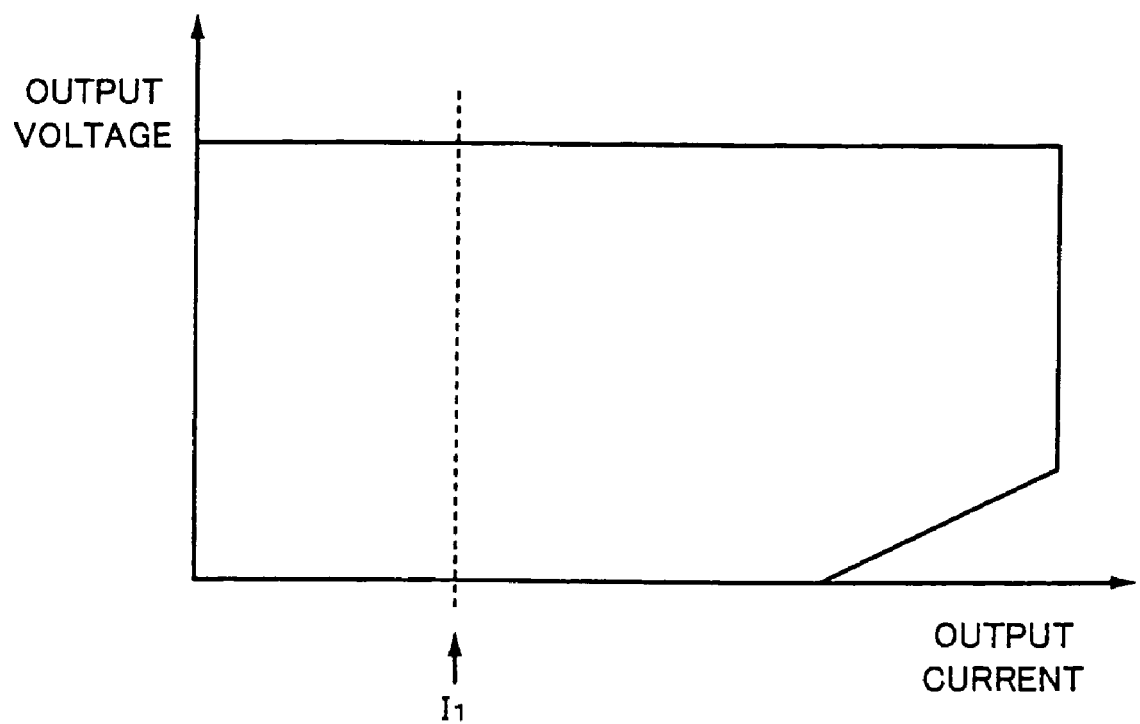
FIG. 2 is a characteristics diagram for explaining output voltage/output current characteristics of the invention.

FIG. 2 shows characteristics A1 as an example of output characteristics of the voltage and current of the switching power supply circuit. When the output current of the switching power supply circuit is set to a current value smaller than a current $I_1$, an oscillation phenomenon occurs. That is, the switching power supply circuit oscillates for a period of time from a state of no load to the current $I_1$ (hereinbelow, referred to as an "oscillation period"). In this example, a current in which it is possible to determine that the value of the load is equal to or less than the half of a value of a load connected ordinarily is assumed to be the current $I_1$. A current in which it is possible to determine that the value of the load is equal to or less than ⅓ of the ordinary load can be also assumed to be the current $I_1$.

Figure 3:
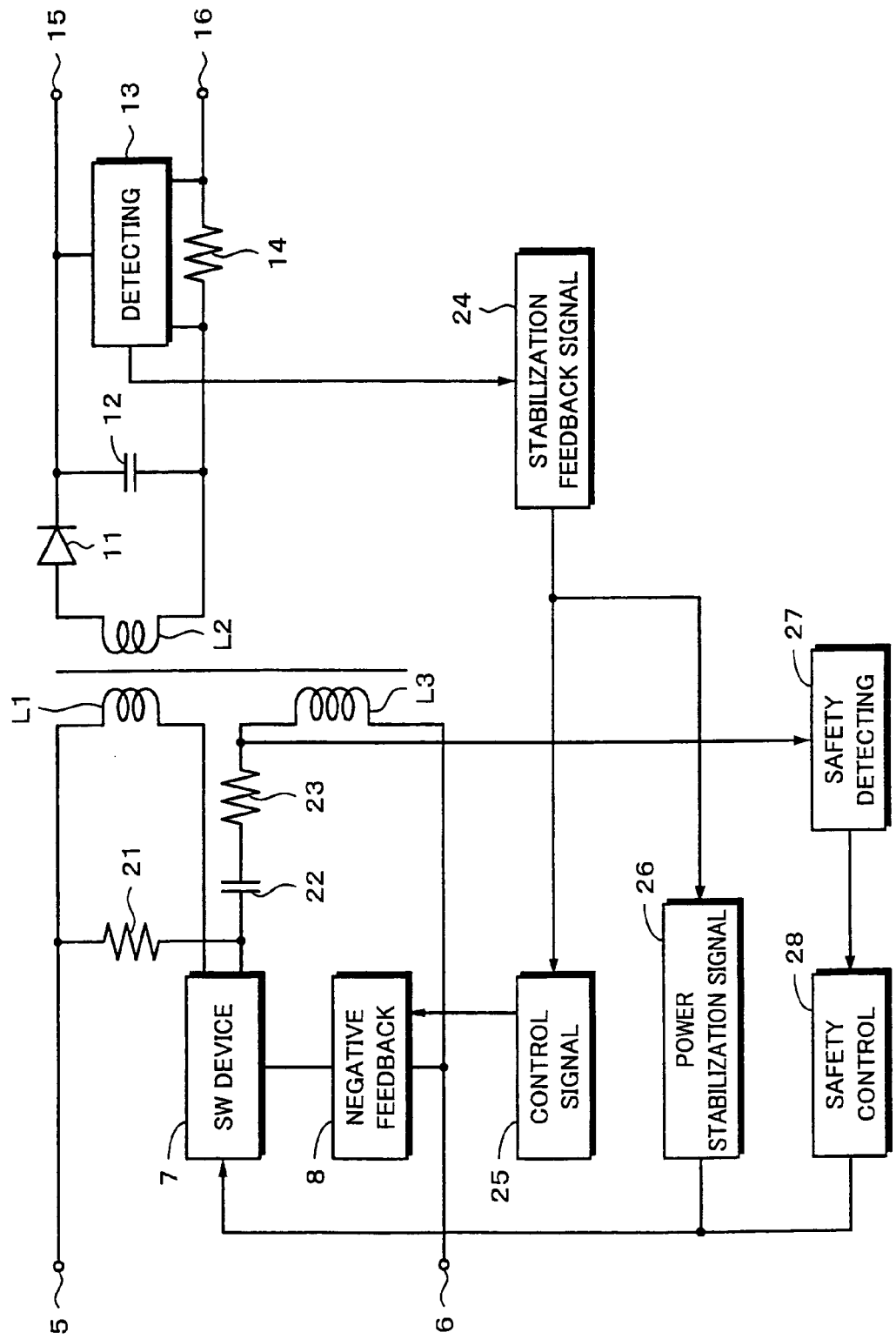
FIG. 3 is a block diagram for explaining a schematic construction of the first embodiment of the invention.

A schematic construction of the first embodiment to which the invention is applied is shown in FIG. 3. If the voltage/current in which the oscillation period occurs are detected in the detecting circuit 13, a control signal is supplied to a stabilization feedback signal circuit 24. The stabilization feedback signal generating circuit 24 supplies a stabilization feedback signal according to the supplied control signal to a control signal generating circuit 25 and a power stabilization signal generating circuit 26. The control signal generating circuit 25 supplies a control signal for changing a negative feedback ratio in accordance with a magnitude of the supplied stabilization feedback signal to the negative feedback circuit 8. The negative feedback ratio according to the supplied control signal is set into the negative feedback circuit 8.

The power stabilization signal generating circuit 26 supplies a control signal to the switching device 7 in order to stabilize the switching power supply circuit. The switching operation according to the supplied control signal is executed in the switching device 7. The current flowing in the feedback coil L3 is controlled by the switching operation of the switching device 7. A safety detecting circuit 27 detects the current flowing in the feedback coil L3 and discriminates the safety from the detected current. The control signal is supplied to a safety control circuit 28 in accordance with a discrimination result. In order to make the switching power supply circuit operative safely, the safety control circuit 28 supplies a control signal to control the operation to the switching device 7.

As mentioned above, since the negative feedback ratio of the negative feedback circuit 8 becomes maximum automatically when the output of the stabilization feedback signal from the stabilization feedback signal generating circuit 24 is stopped, if a safety protecting circuit is provided, the safety protecting circuit can operate easily. Therefore, even if the stabilization feedback signal generating circuit 24 is destroyed, the negative feedback circuit 8 operates. When the negative feedback circuit 8 operates, the operation on the primary side of the transformer L operates stably, so that the safety protecting circuit also operates stably.

In FIG. 3, a resistor 21, a capacitor 22, and a resistor 23 are serially provided between the terminal 5 and the feedback coil L3. A node of the resistor 21 and the capacitor 22 is connected to the switching device 7.

Figure 4:
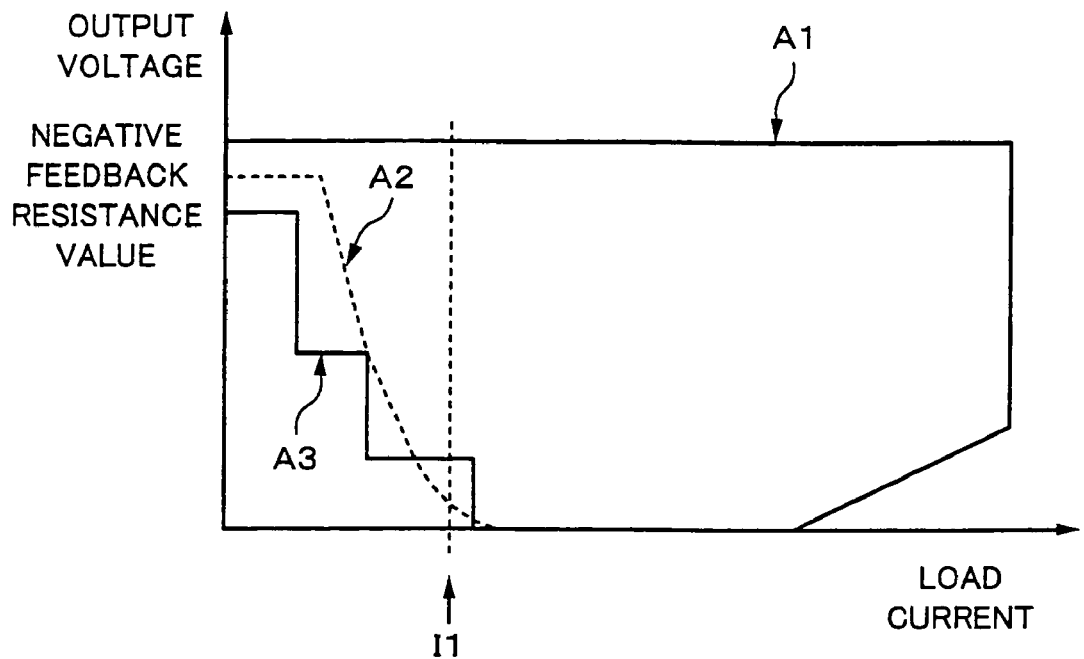
FIG. 4 is a characteristics diagram for explaining a negative feedback circuit of the invention.

As means for changing the negative feedback ratio of the negative feedback circuit 8, there are analog control means and switching control means. The analog control means is means for changing a negative feedback resistance value of the negative feedback circuit 8 in accordance with the detected current as shown in characteristics A2 in FIG. 4 as an example. The switching control means is means for changing the negative feedback resistance value of the negative feedback circuit 8 step by step in accordance with the detected current as shown in characteristics A3 in FIG. 4 as an example. The characteristics A2 and A3 shown in FIG. 4 show the change in negative feedback resistance value to the load current. For example, the output at the maximum load of the characteristics A1 is equal to about 500 Ω at 5 W.

Figure 5:
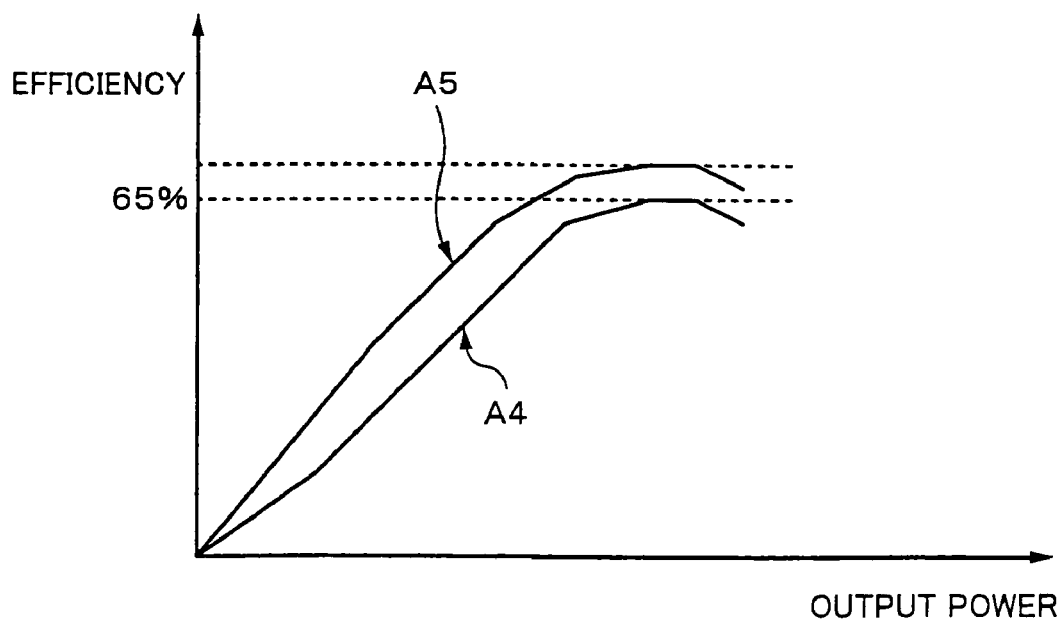
FIG. 5 is a characteristics diagram for explaining efficiency which is obtained by the invention.

In the conventional self-excited switching power supply system, as shown in characteristics A4 in FIG. 5, only efficiency of up to about 65% can be obtained. However, by applying the invention, the efficiency of 5 to 10% can be improved.

Figure 6:
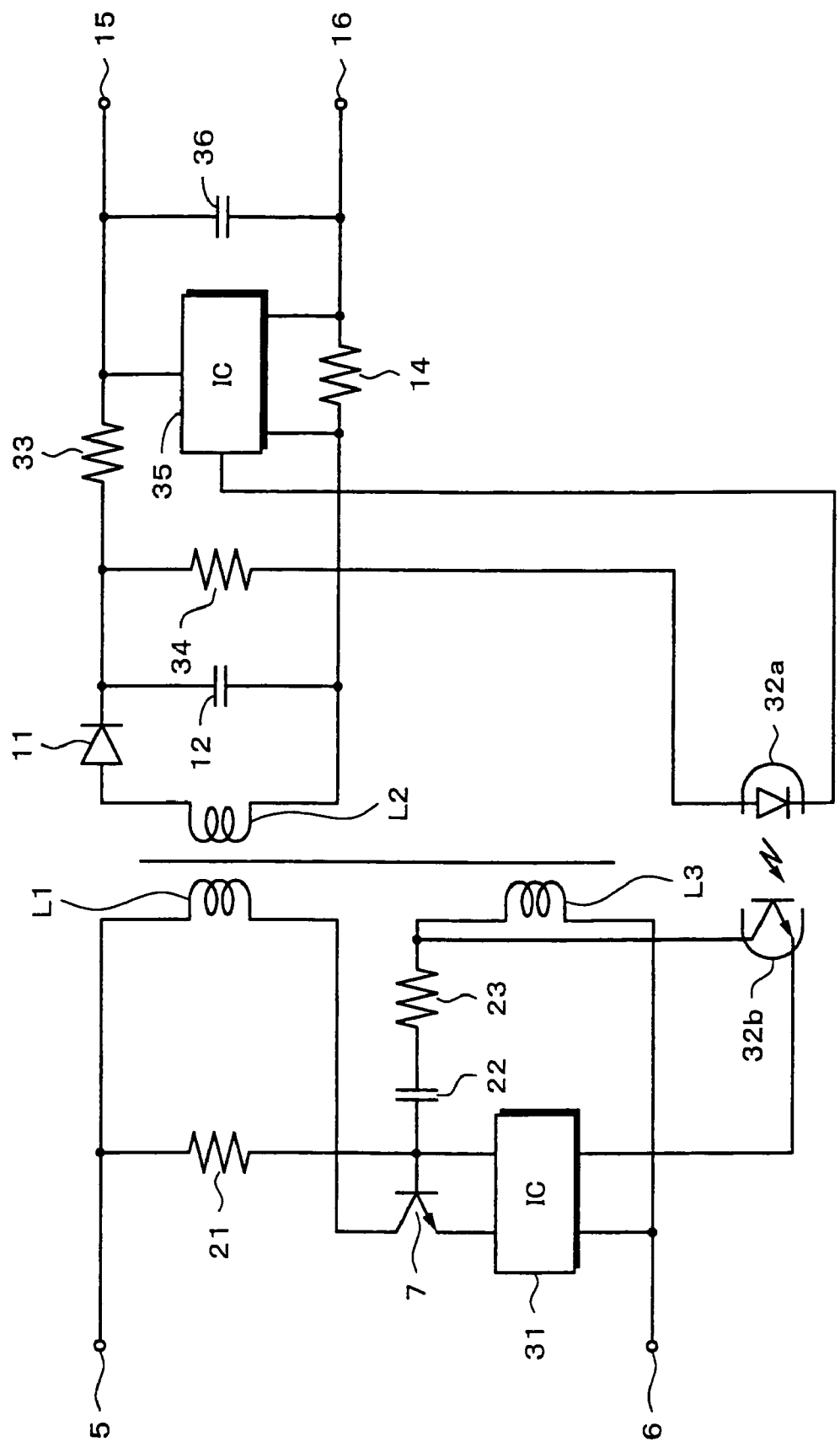
FIG. 6 is a block diagram for explaining another example of the schematic construction of the first embodiment of the invention.

Another example of a schematic construction of the embodiment to which the invention is applied is shown in FIG. 3. In FIG. 6, an NPN-type transistor is used as an example of the switching device 7. As a negative feedback circuit 8 and a detecting circuit 13, circuits in which each function has been constructed as an IC (Integrated Circuit) are used. In FIG. 6, the negative feedback circuit 8 corresponds to an IC 31 and the detecting circuit 13 corresponds to an IC 35. A photocoupler is used as an example of the feedback circuit 9 (stabilization feedback signal generating circuit 24). A phototransistor 32*b* of the photocoupler is provided on the primary side of the transformer L. A light emitting diode 32*a* of the photocoupler is provided on the secondary side of the transformer L. An anode of the light emitting diode 32*a* is connected to the terminal 15 via resistors 34 and 33 and a cathode is connected to the IC 35. A capacitor 36 is provided between the terminals 15 and 16.

Figure 7:
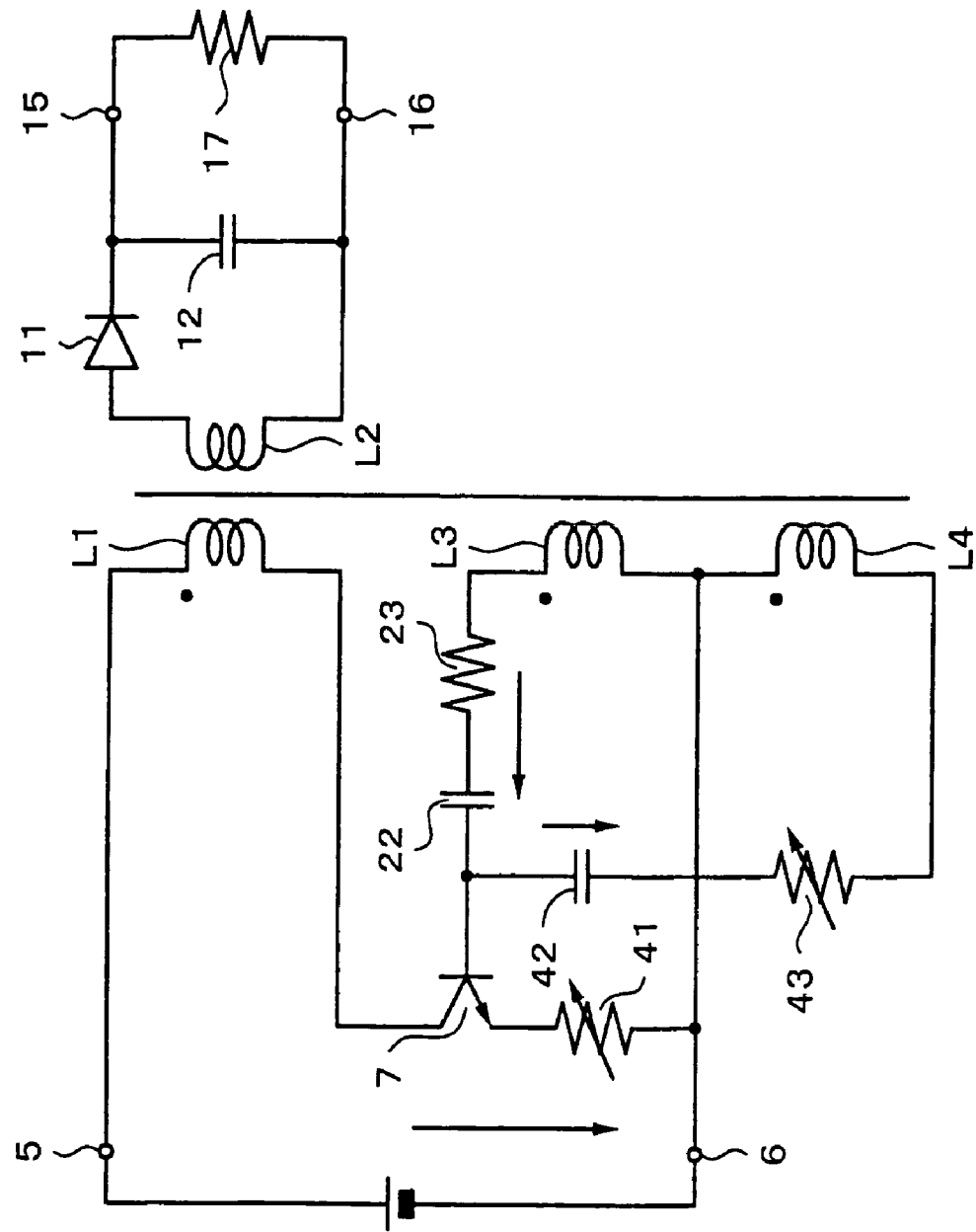
FIG. 7 is a circuit diagram of an example of a feedback circuit which is applied in the invention.

The feedback circuit which is applied in the invention will be explained with reference to FIG. 7. Variable resistors 41 and 43 are provided as an example of the negative feedback circuit 8. The variable resistor 41 is connected to an emitter of a transistor of the switching device 7. The negative feedback circuit is constructed by what is called an emitter feedback and the oscillation can be suppressed by controlling a value of an impedance of the variable resistor 41.

A capacitor 42 and the variable resistor 43 are provided between a base of the transistor of the switching device 7 and one end of a negative feedback coil L4. The other end of the negative feedback coil L4 is connected to the terminal 6. A signal obtained by inverting the signal of the feedback coil L3 by 180° can be extracted by the negative feedback coil L4. The extracted signal is supplied to the base of the transistor of the switching device 7 via the variable resistor 43 and the capacitor 42 and a negative feedback circuit is constructed by what is called a base feedback and the oscillation of the switching power supply circuit can be suppressed by controlling a value of an impedance of the variable resistor 43.

Figure 8A:
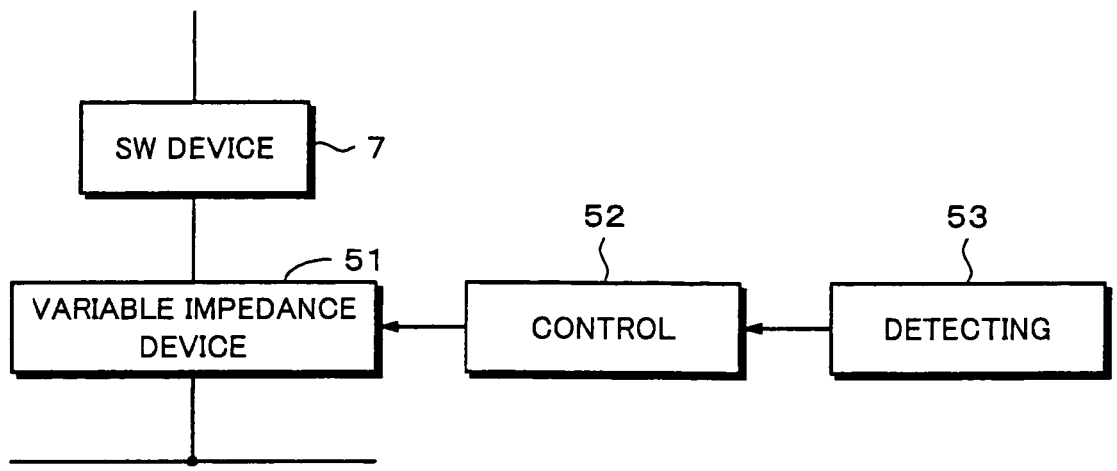
FIG. 8, consisting of FIGS. 8A and 8B, is a block diagram of an example for explaining an emitter feedback and a base feedback of the invention.

A block diagram for explaining the negative feedback circuit constructed by the emitter feedback is shown in FIG. 8A. In the negative feedback circuit by the emitter feedback shown in FIG. 8A, the output voltage and the output current are detected in a detecting circuit 53. If it is determined that the detected output voltage and output current are equal to values in which the oscillation period occurs, a predetermined signal is supplied to a control circuit 52. In the control circuit 52, a control signal so as to obtain a value of an impedance in which the switching power supply circuit does not oscillate is supplied to a variable impedance device 51 in response to the supplied predetermined signal. The variable impedance device 51 is set to the value of the impedance according to the supplied control signal. By the set value of the impedance, a negative feedback is applied to the switching device 7 and the oscillation of the switching power supply circuit can be suppressed. The switching device 7 to which the negative feedback has been applied executes the switching operation so as to output the predetermined voltage and current.

Figure 8B:
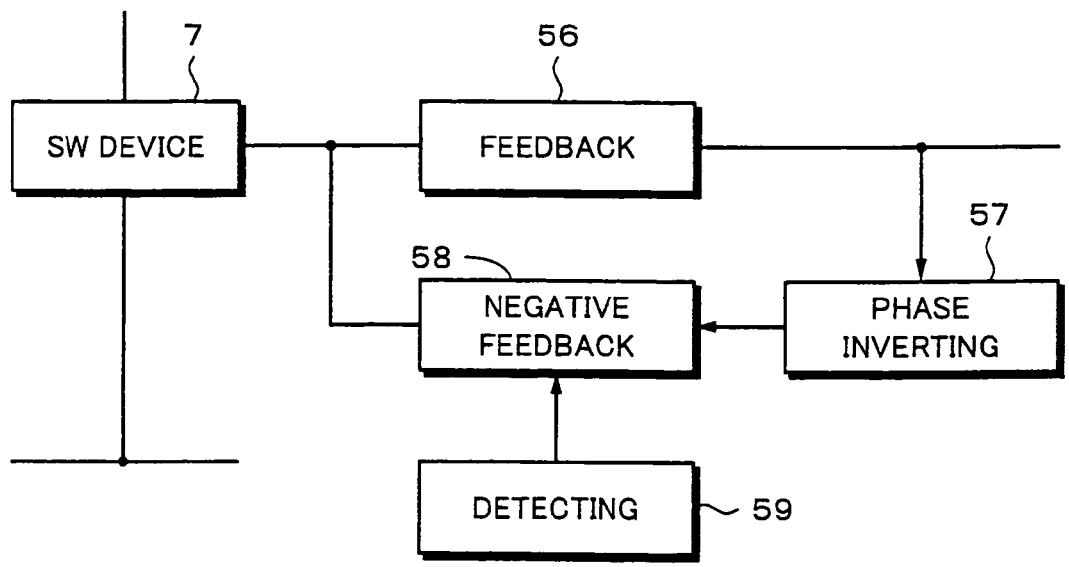

A block diagram for explaining the negative feedback circuit constructed by the base feedback is shown in FIG. 8B. In the negative feedback circuit by the base feedback shown in FIG. 8B, the output voltage and the output current are detected in a detecting circuit 59. If it is determined from the detected output voltage and output current that the switching power supply circuit oscillates, a predetermined signal is supplied to a negative feedback circuit 58. A signal obtained by inverting a phase of a signal supplied via a feedback circuit 56 by 180° by a phase inverting circuit 57 is supplied to the negative feedback circuit 58. In the negative feedback circuit 58, on the basis of a predetermined signal from the detecting circuit 59, the supplied phase-inverted signal is negative-fed back to the switching device 7 so that the switching power supply circuit does not oscillate. The switching device 7 to which the negative feedback has been applied executes the switching operation so as to output the predetermined voltage and current.

Figure 9:
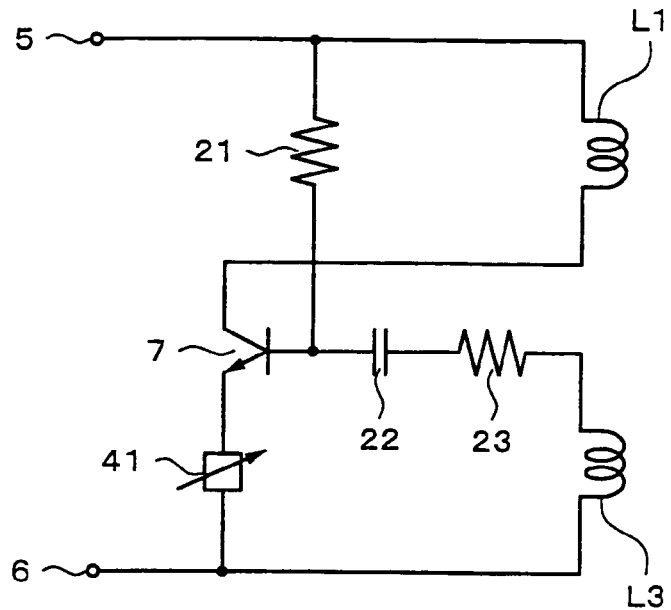
FIG. 9 is a circuit diagram of an example for explaining the emitter feedback which is applied in the invention.

An example of the emitter feedback is shown in FIG. 9. FIG. 9 shows only the primary side of the switching power supply circuit. Only the variable resistor 41 is used as a negative feedback circuit 8 and the oscillation of the switching power supply circuit can be suppressed by the emitter feedback.

Figure 10:
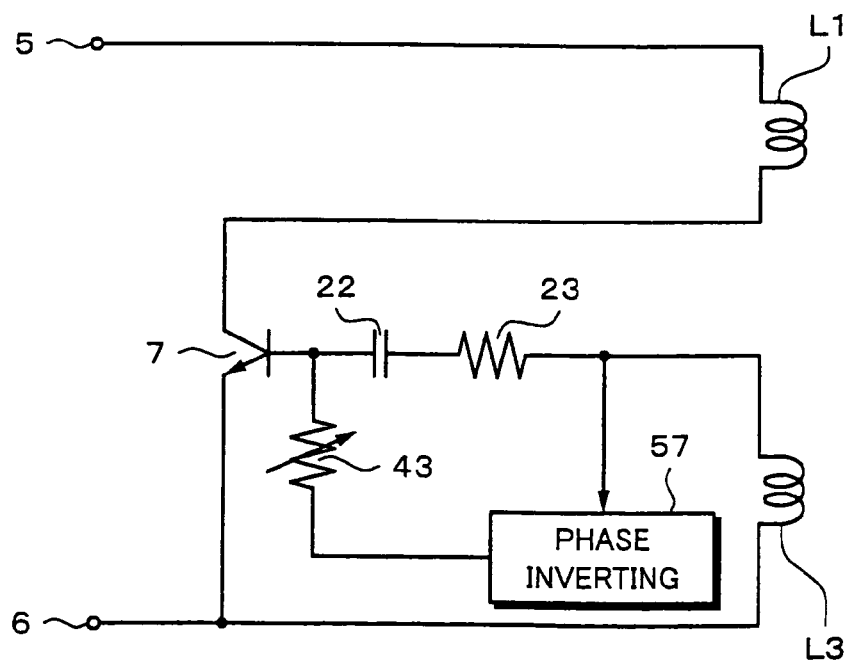
FIG. 10 is a circuit diagram of a first example for explaining a base feedback which is applied in the invention.

Subsequently, a first example of the base feedback is shown in FIG. 10. FIG. 10 shows only the primary side of the switching power supply circuit. Only the variable resistor 43 is used as a negative feedback circuit 8 and the oscillation of the switching power supply circuit can be suppressed by the base feedback. At this time, not only the value of the impedance of the variable resistor 43 is changed but also a value of an amplifier built in the phase inverting circuit 57 can be varied.

Figure 11:
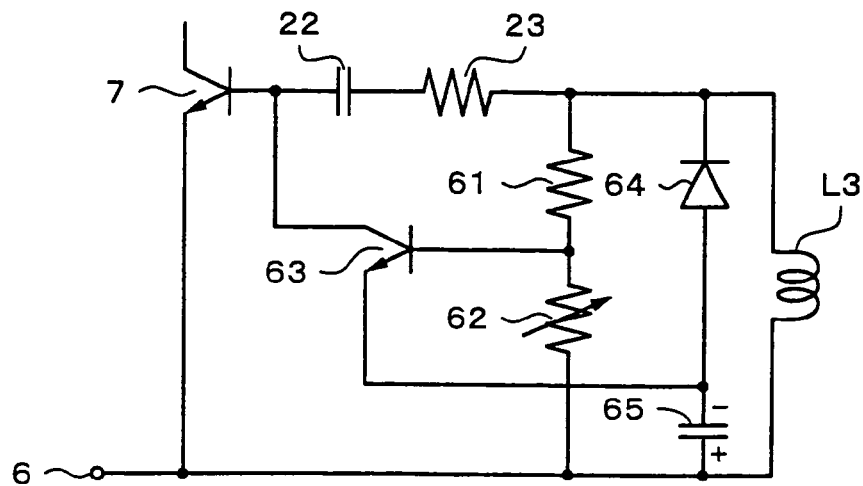
FIG. 11 is a circuit diagram of a second example for explaining a base feedback which is applied in the invention.

A second example of the base feedback is shown in FIG. 11. FIG. 11 shows a portion from the switching device 7 to the terminal 6 via the feedback coil L3. A collector of an NPN-type transistor 63 is connected to the base of the transistor of the switching device 7. The capacitor 22 and resistors 23 and 61 are provided between the collector and a base of the transistor 63. A variable resistor 62 is provided between the base of the transistor 63 and the terminal 6. A capacitor 65 is provided between an emitter of the transistor and the terminal 6. An anode of a diode 64 is connected to the emitter of the transistor 63 and a cathode is connected to a node of the resistors 23 and 61.

In FIG. 11, since a current flowing in the base of the transistor 63 can be controlled by controlling a value of an impedance of the variable resistor 62, the negative feedback can be applied to the switching device 7.

Figure 12:
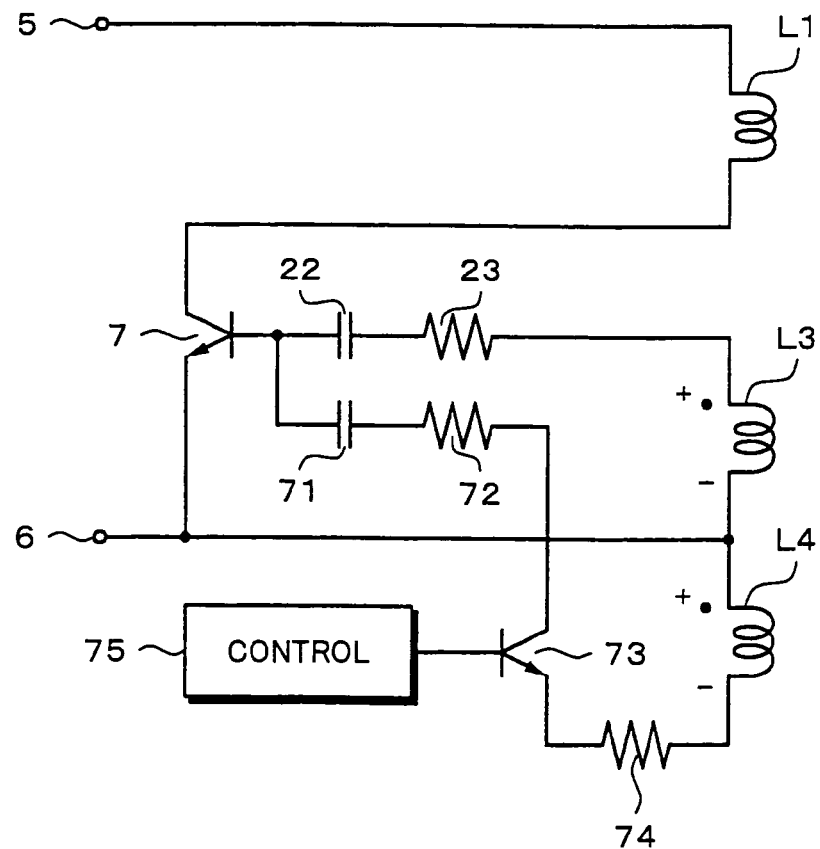
FIG. 12 is a circuit diagram of a third example for explaining a base feedback which is applied in the invention.

A third example of the base feedback is shown in FIG. 12. FIG. 12 shows only the primary side of the switching power supply circuit. A capacitor 71 and a resistor 72 are provided between the base of the transistor of the switching device 7 and a collector of an NPN-type transistor 73. A control circuit 75 is connected to a base of the transistor 73 and one end of the negative feedback coil L4 is connected to an emitter of the transistor 73 via a resistor 74. The signal obtained by inverting the signal of the feedback coil L3 by 180° can be extracted by the negative feedback coil L4. The transistor 73 is controlled by the control circuit 75 and the extracted signal is supplied to the base of the transistor of the switching device 7. The negative feedback circuit is constructed by what is called a base feedback and the oscillation can be suppressed by controlling a value of an impedance of the transistor 73.

Figure 13:
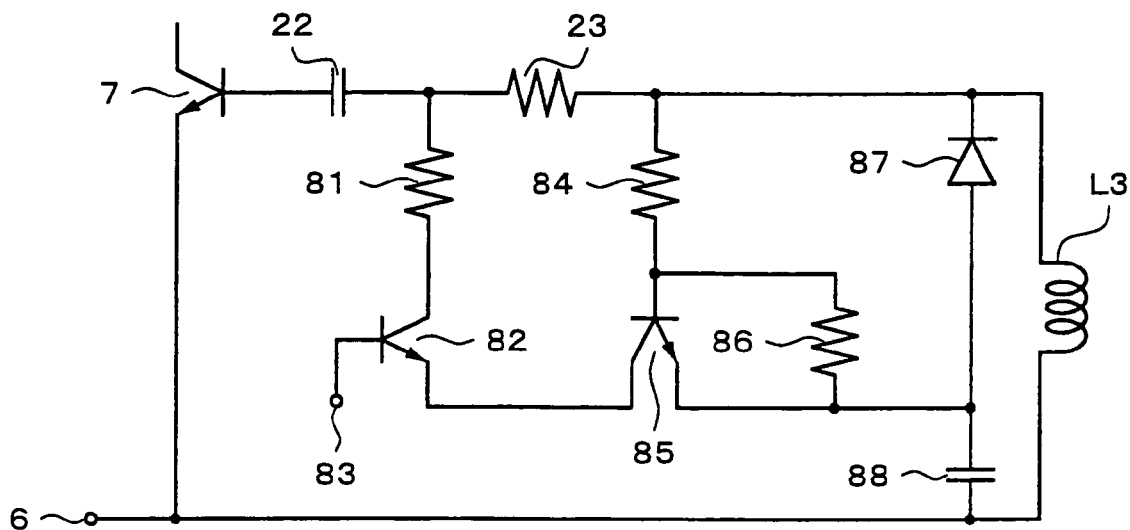
FIG. 13 is a circuit diagram of a fourth example for explaining a base feedback which is applied in the invention.

A fourth example of the base feedback is shown in FIG. 13. FIG. 13 shows a portion from the switching device 7 to the terminal 6 via the feedback coil L3. The capacitor 22 and a resistor 81 are provided between the base of the transistor of the switching device 7 and a collector of an NPN-type transistor 82. A terminal 83 is led out from a base of the transistor 83 and an emitter is connected to a collector of an NPN-type transistor 85. The capacitor 22 and resistors 23 and 84 are provided between the base of the transistor of the switching device 7 and a base of the transistor 85. A resistor 86 is provided between an emitter and the base of the transistor 85. An anode of a diode 87 is connected to the emitter of the transistor 85 and a cathode is connected to a node of the resistors 23 and 84. A capacitor 88 is provided between the anode of the diode 87 and the terminal 6.

In the fourth example of FIG. 13, the phase of the signal is inverted by the transistor 85 and a resistor 86. The inverted signal is supplied to the base of the transistor of the switching device 7.

Figure 14:
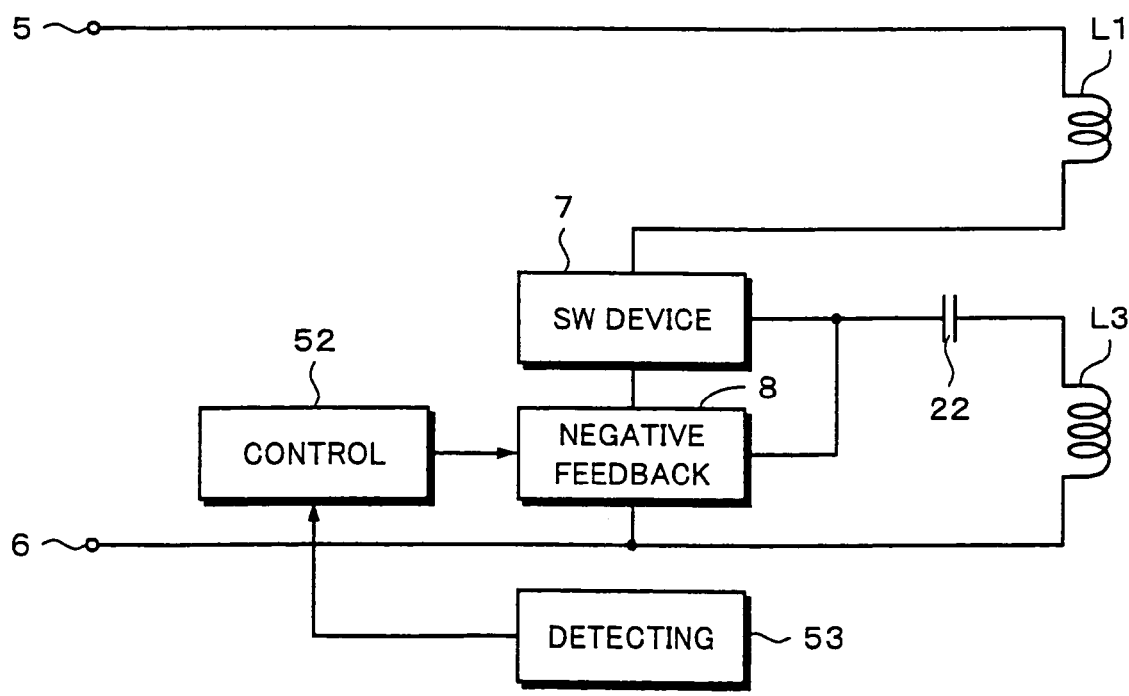
FIG. 14 is a block diagram of a first example of the first embodiment to which the invention is applied.

A first example of the first embodiment to which the invention is applied is shown in FIG. 14. According to the first embodiment, a voltage and a current which are outputted are detected on the secondary side and a negative feedback is applied to the switching device 7 in accordance with the values of the detected voltage and current.

The output voltage and the output current are detected in the detecting circuit 53. If it is determined that the detected output voltage and output current are equal to values in which the oscillation period occurs, a predetermined signal is supplied to the control circuit 52. In the control circuit 52, the control signal so as to obtain the value of the impedance in which the switching power supply circuit does not oscillate is supplied to the negative feedback circuit 8. The negative feedback circuit 8 is set to the value of the impedance according to the supplied control signal. By the set value of the impedance, a negative feedback is applied to the switching device 7 and the oscillation of the switching power supply circuit can be suppressed. The switching device 7 to which the negative feedback has been applied executes the switching operation so as to output the predetermined voltage and current.

Figure 15:
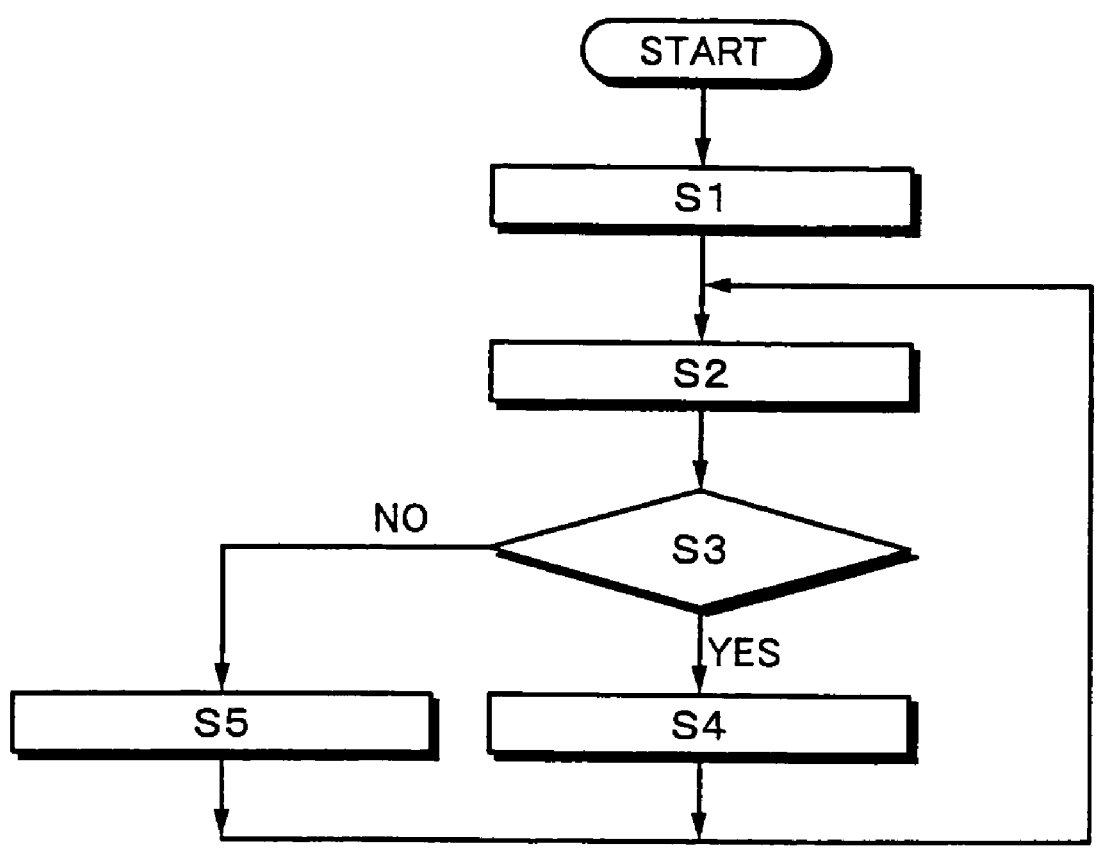
FIG. 15 is a flowchart for explaining control of the first embodiment to which the invention is applied.

An example of the control of the first embodiment will be described with reference to a flowchart of FIG. 15. In step S1, the operation of the switching device 7 is started and the voltage and current are outputted from the switching power supply circuit. In step S2, the value of a load connected to this switching power supply circuit is detected. For example, as mentioned above, the output voltage and the output current are detected and the value of the connected load is detected. In step S3, whether the detected output voltage and output current are equal to the predetermined values in which it is necessary to apply the negative feedback or not is discriminated. That is, whether the detected output voltage and output current are equal to the values in which the oscillation period occurs or not is discriminated. If it is determined that they are equal to the values in which the oscillation period occurs, a control routine advances to step S4. If it is determined that they are not equal to the values in which the oscillation period occurs, a control routine advances to step S5. In step S4, the operation is controlled so that the negative feedback is applied to the switching device 7. In step S5, the operation is controlled so that the negative feedback is not applied to the switching device 7.

Figure 16:
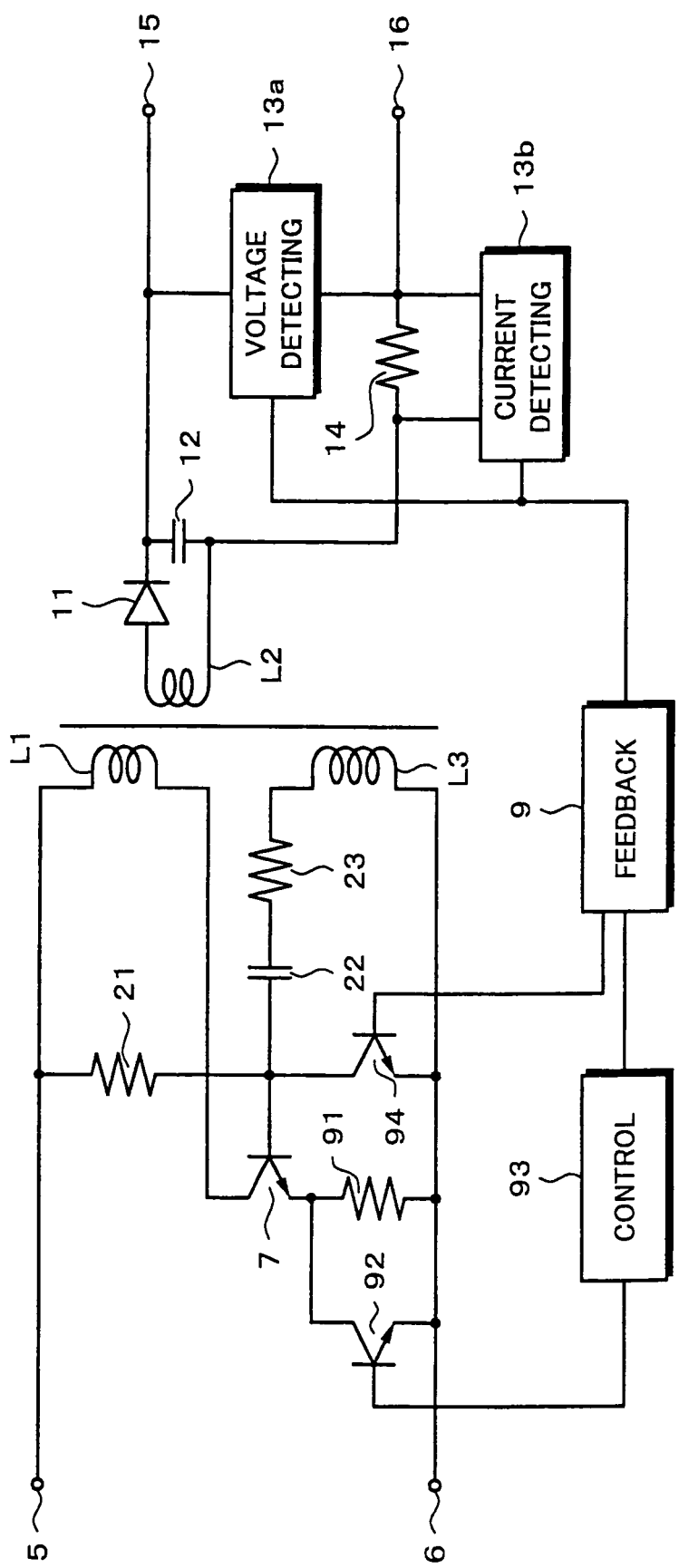
FIG. 16 is a block diagram of a second example of the first embodiment to which the invention is applied.

A second example of the first embodiment to which the invention is applied is shown in FIG. 16. The emitter of the transistor of the switching device 7 is connected to the terminal 6 via a resistor 91. The resistor 91 is provided between an emitter and a collector of an NPN-type transistor 92. A base of the transistor 92 is connected to a control circuit 93. The base of the transistor of the switching device 7 is connected to a collector of an NPN-type transistor 94. An emitter of the transistor 94 is connected to the terminal 6 and a base is connected to the feedback circuit 9. A voltage detecting circuit 13*a* is provided between the terminals 15 and 16. A current detecting circuit 13*b* is provided in parallel with the resistor 14.

Figure 17:
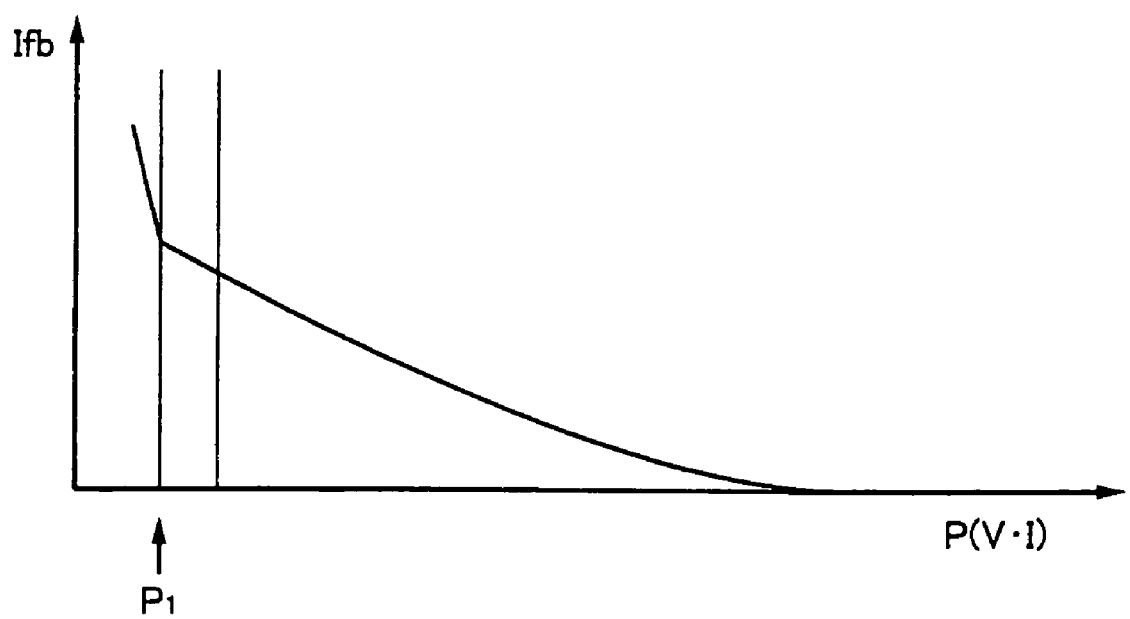
FIG. 17 is a characteristics diagram for use in explanation of the negative feedback of the invention.

In the voltage detecting circuit 13*a*, a voltage which is outputted from the terminals 15 and 16 is detected. In the current detecting circuit 13*b*, a current which is outputted from both ends of the resistor 14 is detected. In the feedback circuit 9, the negative feedback is applied to the switching device 7 in accordance with signals from the voltage detecting circuit 13*a* and the current detecting circuit 13*b*. For example, when a value of the detected current is equal to a value lower than a point $P_1$ shown in FIG. 17, the negative feedback is applied to the switching device 7. In FIG. 17, an axis of abscissa indicates an electric power P (=VI) which is outputted and an axis of ordinate indicates the current flowing in the feedback circuit 9. In FIG. 16, whether the current is supplied to the resistor 91 or not is switched by switching the ON/OFF of the transistor 92. That is, the value of the impedance is switched by the ON/OFF of the transistor 92. A transistor 94 is provided to stabilize the operation of the switching power supply circuit.

Figure 18:
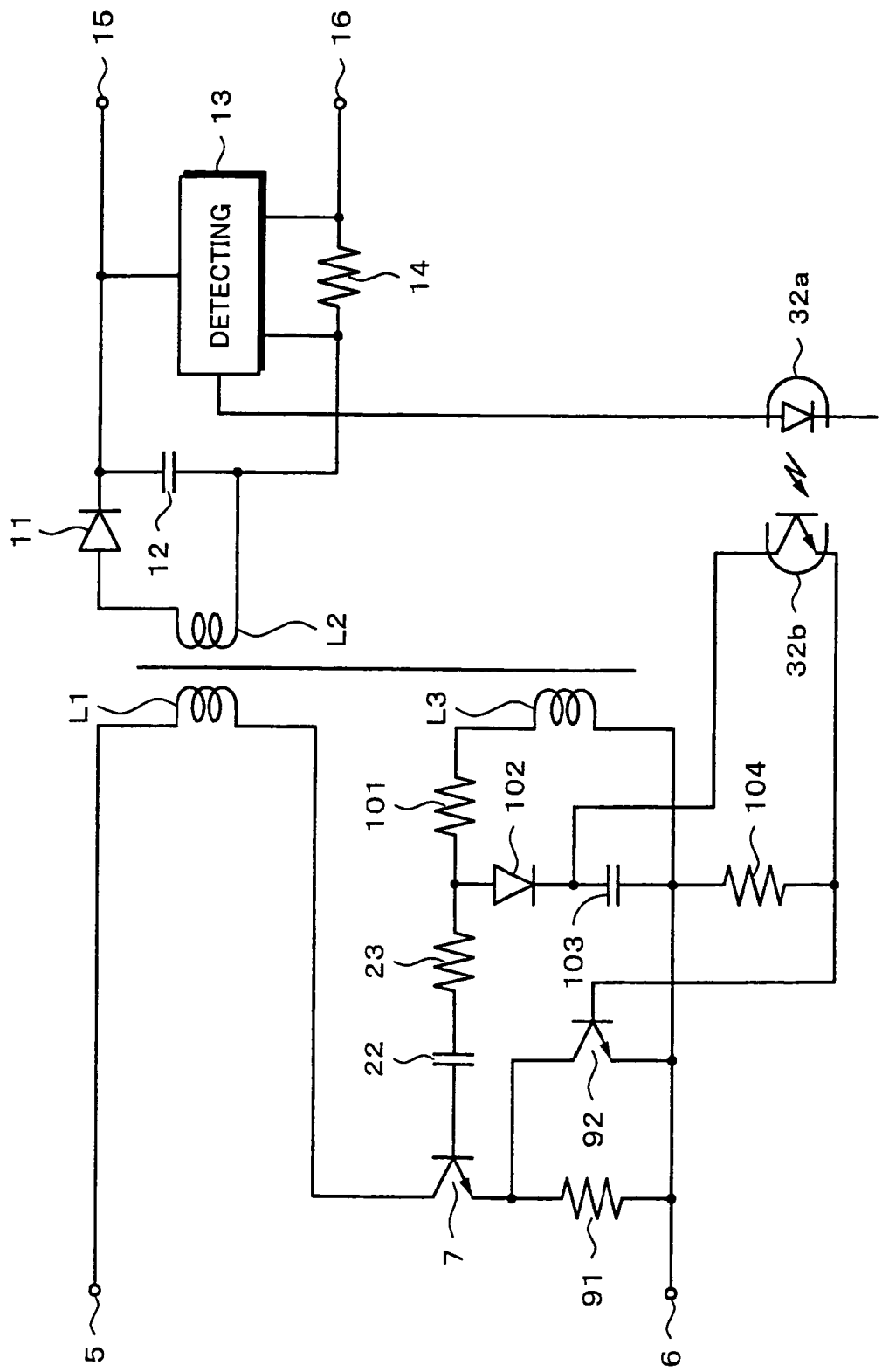
FIG. 18 is a circuit diagram of a third example of the first embodiment to which the invention is applied.

A third example of the first embodiment to which the invention is applied is shown in FIG. 18. A resistor 101 is provided between the resistor 23 and the feedback coil L3. A node of the resistors 23 and 101 and an anode of a diode 102 are connected. A capacitor 103 is provided between a cathode of the diode 102 and the terminal 6. A resistor 104 is provided between the terminal 6 and the transistor 92. A collector of the photodiode 32b is connected to the cathode of the diode 102 and an emitter is connected to the base of the transistor 92.

Figure 19:
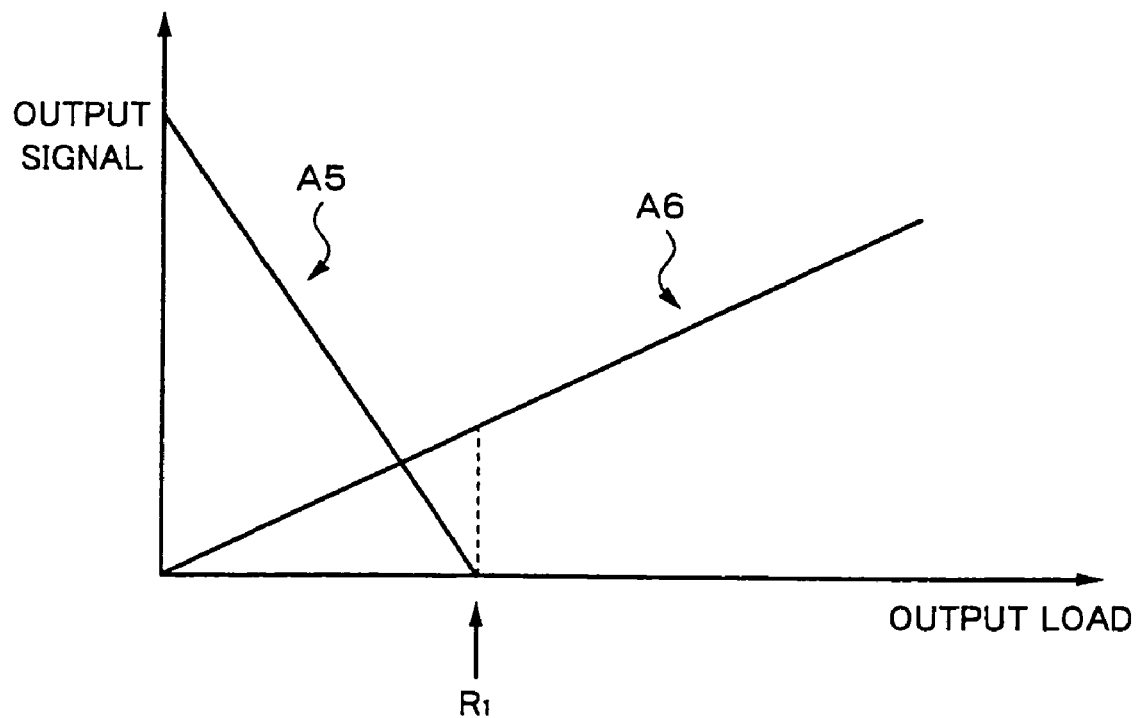
FIG. 19 is a characteristics diagram for use in explanation of the negative feedback of the invention.

A change in value of the impedance of the transistor 92 to a change in value of the output load is shown by characteristics A5 in FIG. 19. A change in value of the base current of the transistor 92 to the change in value of the output load is shown by characteristics A6 in FIG. 19. A point $R_1$ in FIG. 19 denotes a saturation point (switching mode).

Figure 20:
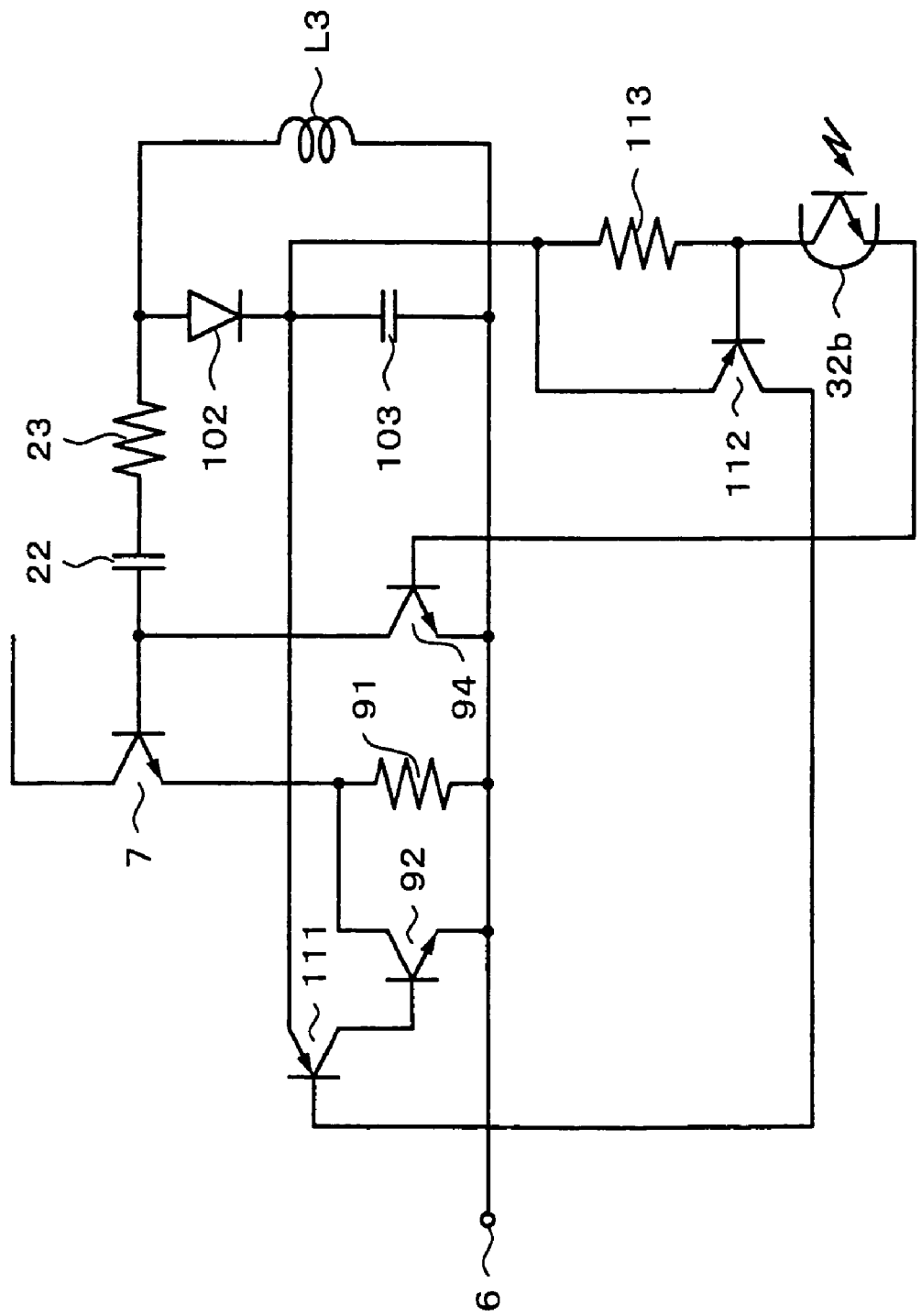
FIG. 20 is a circuit diagram of a fourth example of the first embodiment to which the invention is applied.

A fourth example of the first embodiment to which the invention is applied is shown in FIG. 20. FIG. 20 shows a portion from the switching device 7 to the terminal 6 via the feedback coil L3. An emitter of a PNP-type transistor 111 is connected to the cathode of the diode 102, a collector is connected to the base of the transistor 92, and a base is connected to a collector of an NPN-type transistor 112. An emitter of the transistor 112 is connected to the cathode of the diode 102. A resistor 113 is provided between the emitter and a base of the transistor 112. The collector of the phototransistor 32b is connected to the base of the transistor 112 and the emitter is connected to the base of the transistor 94.

Figure 21:
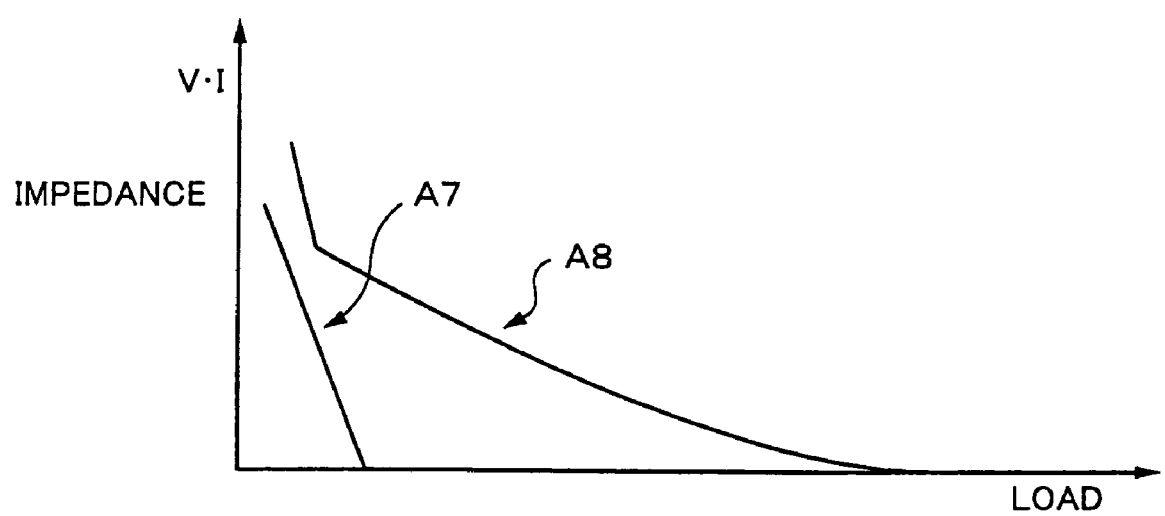
FIG. 21 is a characteristics diagram for use in explanation of the negative feedback of the invention.

A change in value of the impedance to a change in load electric power is shown by characteristics A7 in FIG. 21. Changes in values of the voltage and current to the change in load electric power are shown by characteristics A8 in FIG. 21. The characteristics A7 show the impedance comprising the resistor 91 and the transistor 92.

Figure 22:
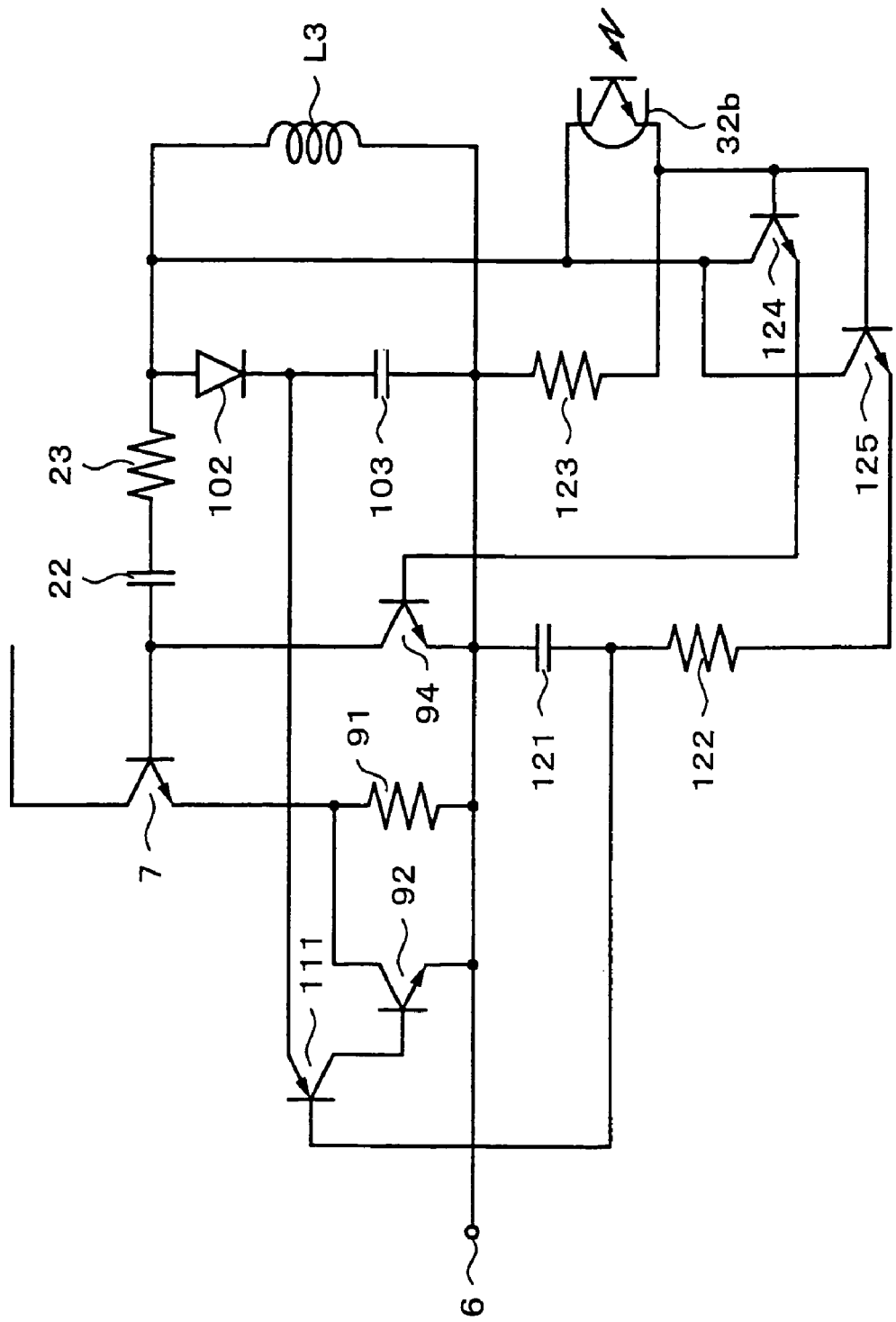
FIG. 22 is a circuit diagram of a fifth example of the first embodiment to which the invention is applied.

A fifth example of the first embodiment to which the invention is applied is shown in FIG. 22. FIG. 22 shows a portion from the switching device 7 to the terminal 6 via the feedback coil L3. A capacitor 121 and a resistor 122 are provided between an emitter of an NPN-type transistor 125 and the terminal 6. The base of the transistor 111 is connected to a node of the capacitor 121 and the resistor 122. A collector of the transistor 125 is connected to a collector of an NPN-type transistor 124. A base of the transistor 125 is connected to a base of the transistor 124. An emitter of the transistor 124 is connected to the base of the transistor 94. The base of the transistor 124 is connected to the emitter of the phototransistor 32b. The collector of the transistor 124 is connected to the anode of the diode 102. A resistor 123 is provided between the emitter of the phototransistor 32b and the terminal 6.

Figure 23:
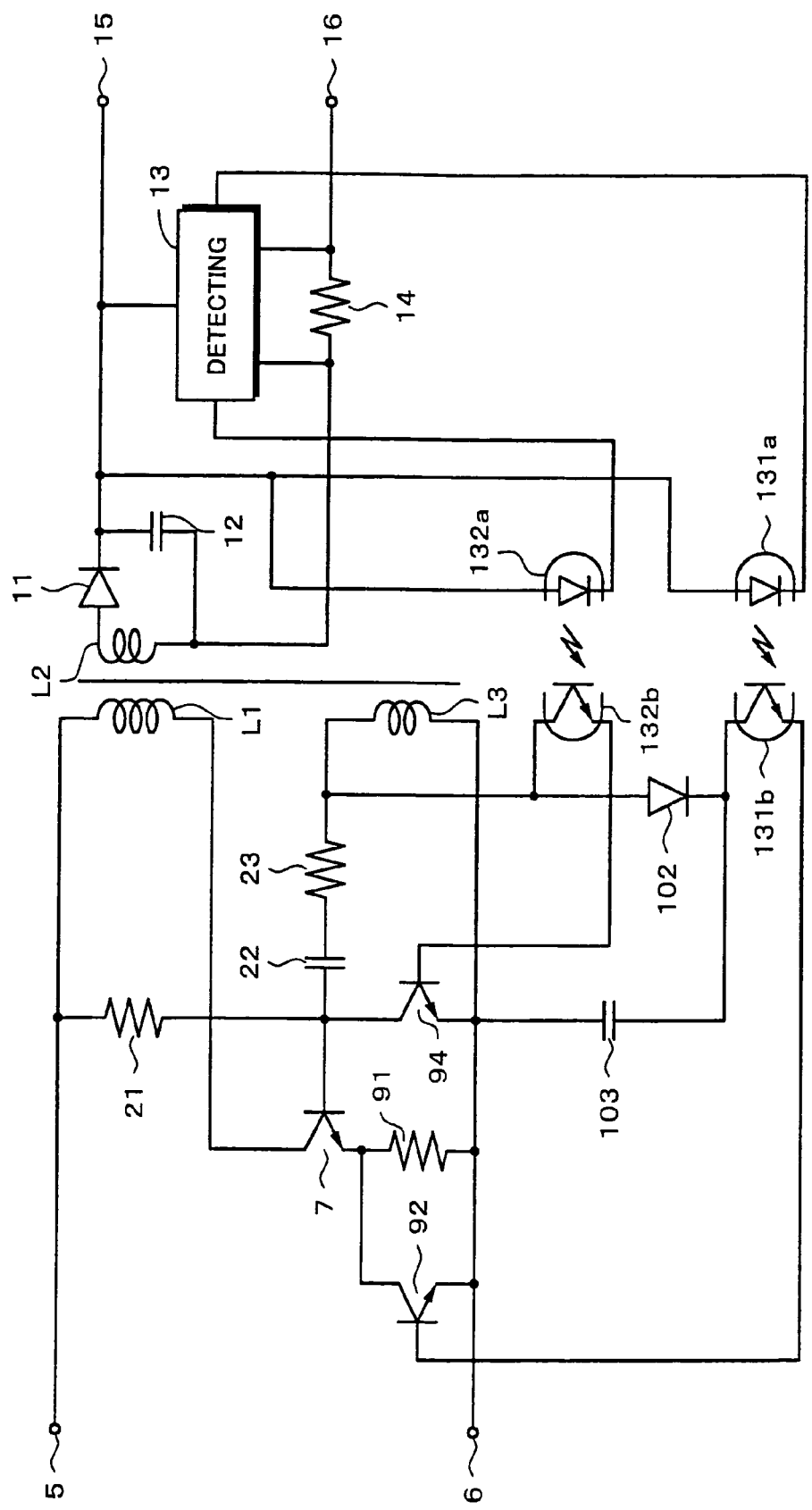
FIG. 23 is a circuit diagram of a sixth example of the first embodiment to which the invention is applied.

A sixth example of the first embodiment to which the invention is applied is shown in FIG. 23. In FIG. 23, a feedback signal for stabilization and a feedback signal for negative feedback control are separately provided. An anode of a light emitting diode 131a of a photocoupler 131 is connected to the terminal 15 and a cathode is connected to the detecting circuit 13. A collector of a phototransistor 131b of the photocoupler 131 is connected to the cathode of the diode 102 and an emitter is connected to the base of the transistor 92. An anode of a light emitting diode 132a of a photocoupler 132 is connected to the terminal 15 and a cathode is connected to the detecting circuit 13. A collector of a phototransistor 132b of the photocoupler 132 is connected to the anode of the diode 102 and an emitter is connected to the base of the transistor 94.

The photocoupler 131 supplies the signal for negative feedback control from the secondary side to the primary side. The photocoupler 132 supplies the signal for stabilization from the secondary side to the primary side.

Figure 24:
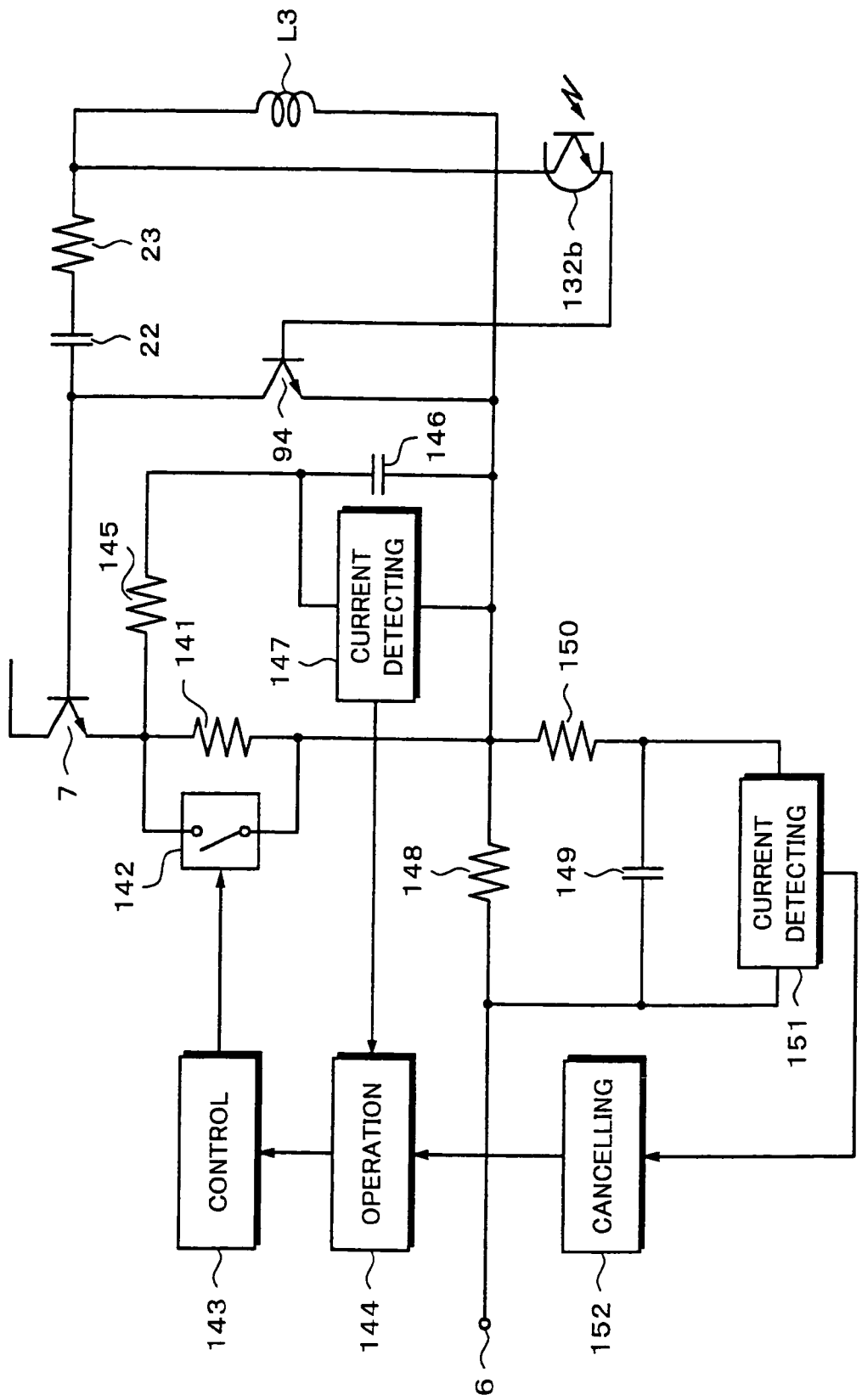
FIG. 24 is a circuit diagram of a first example of the second embodiment to which the invention is applied.

A first example of the second embodiment to which the invention is applied is shown in FIG. 24. According to the second embodiment, a voltage and a current are detected from a feedback circuit and a negative feedback is applied to the switching device 7 in accordance with values of the detected voltage and current. That is, in the second embodiment, the voltage and current are detected from a negative feedback resistor.

Resistors 141 and 148 are serially provided between the emitter of the transistor of the switching device 7 and the terminal 6. A switch circuit 142 is provided in parallel with the resistor 141. The ON/OFF operations of the switch circuit 142 are controlled by a control circuit 143.

Figure 25:
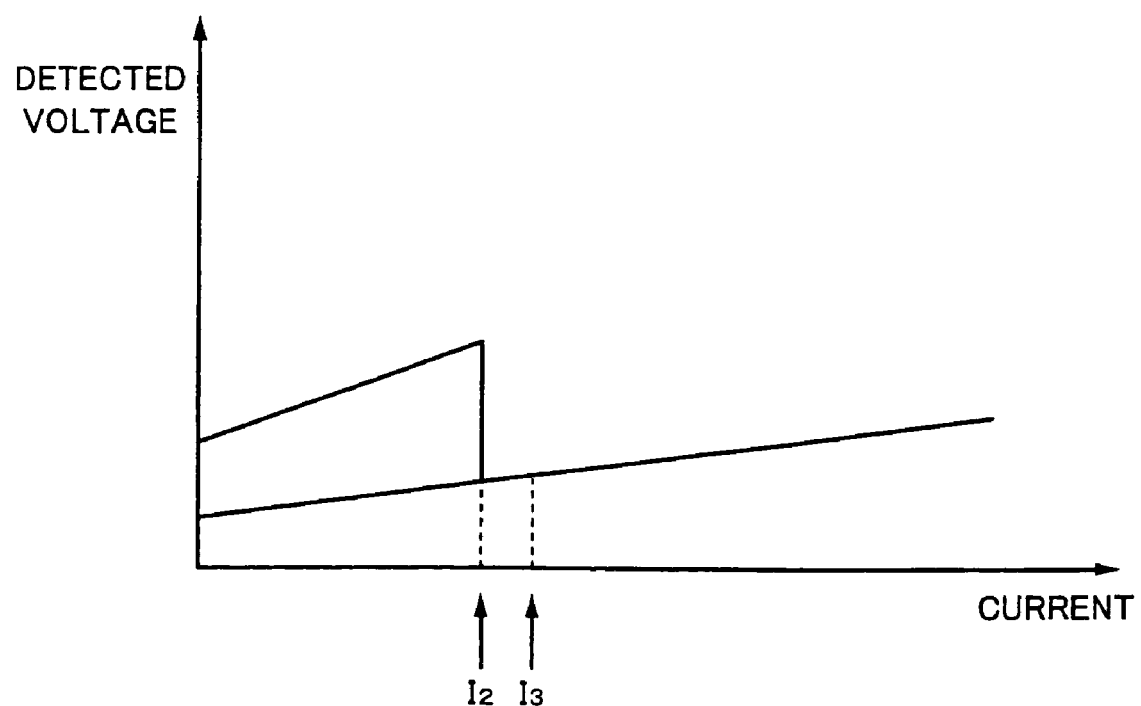
FIG. 25 is a characteristics diagram for explaining switching of a switch circuit which is used in the invention.

A resistor 145 and a capacitor 146 are provided in parallel with the resistor 141. The resistor 145 and the capacitor 146 construct an integrating circuit. A current detecting circuit 147 is connected to both ends of the capacitor 146 and detects the current therefrom. When the detected current becomes a current $I_2$ as shown in FIG. 25, a signal to turn on the switch circuit 142 is supplied from the current detecting circuit 147 to an operation circuit 144. The operation circuit 144 supplies the signal to turn on the switch circuit 142 to the control circuit 143.

A capacitor 149 and a resistor 150 are provided in parallel with the resistor 148. The capacitor 149 and the resistor 150 construct an integrating circuit. Further, a current detecting circuit 151 is connected to both ends of the capacitor 149 and detects the current therefrom. When the detected current becomes a current $I_3$ as shown in FIG. 25, a signal to turn off the switch circuit 142 is supplied from the current detecting circuit 151 to a cancelling circuit 152. The cancelling circuit 152 supplies the signal to turn off the switch circuit 142 to the operation circuit 144. The operation circuit 144 to which the signal has been supplied turns off the switch circuit 142 via the control circuit 143.

In the first example of FIG. 24, after the switch circuit 142 was turned on, when the current becomes the current $I_3$, the switch circuit 142 is turned off. However, it is also possible to set in a manner such that after the switch circuit 142 was turned on, the switch circuit 142 is turned off after the elapse of a predetermined time.

Figure 26:
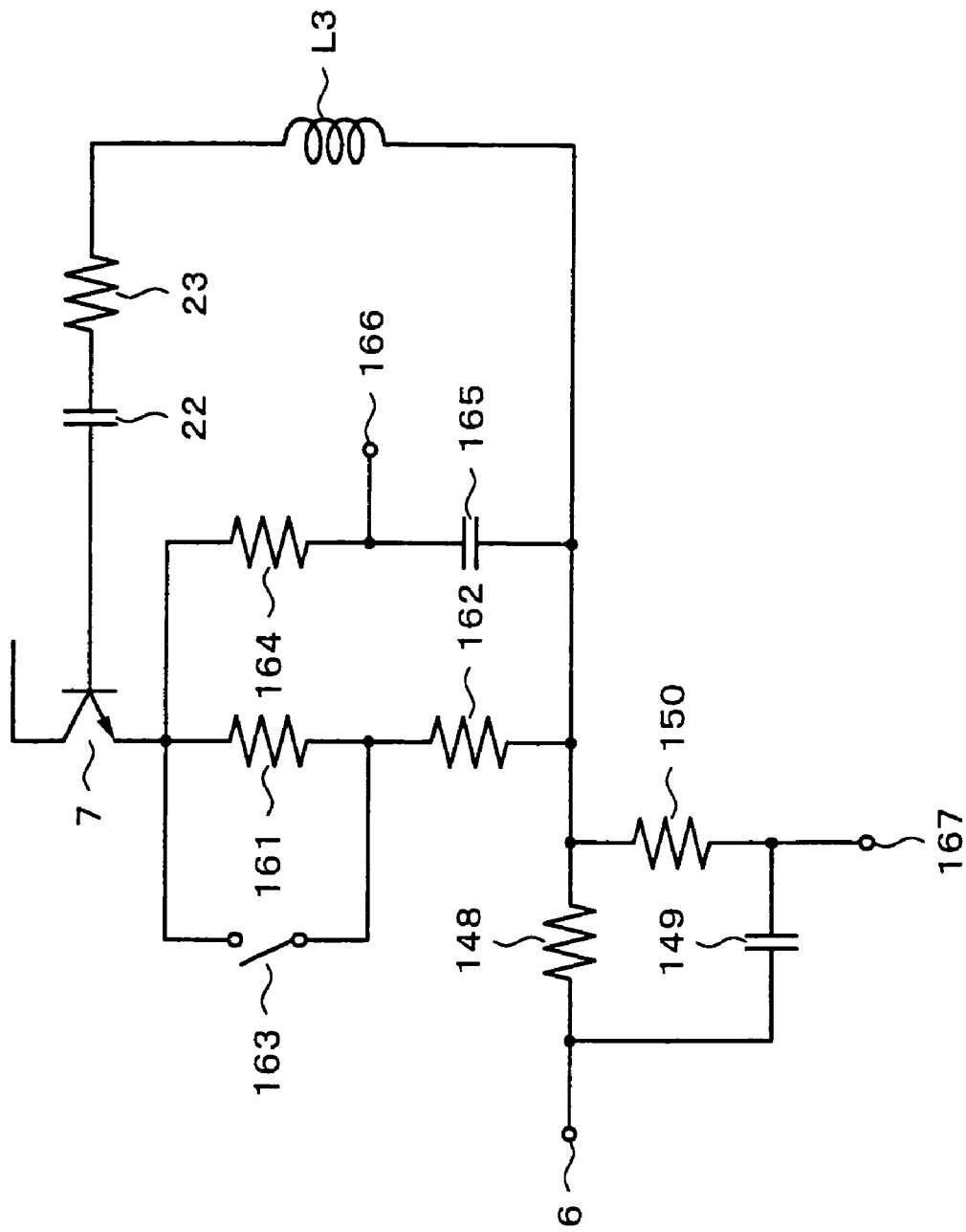
FIG. 26 is a block diagram of a second example of the second embodiment to which the invention is applied.

A second example of the second embodiment to which the invention is applied is shown in FIG. 26. FIG. 26 shows a portion from the switching device 7 to the terminal 6 via the feedback coil L3. Resistors 161, 162, and 148 are serially provided between the emitter of the transistor of the switching device 7 and the terminal 6. A switch circuit 163 is provided in parallel with the resistor 161. A resistor 164 and a capacitor 165 are provided in parallel with the resistors 161 and 162. A terminal 166 is led out from a node of the resistor 164 and the capacitor 165. A terminal 167 is led out from a node of the capacitor 149 and the resistor 150.

At this time, a relation of magnitudes of resistance values of the resistors 161 and 148 is as follows.

resistor 161>resistor 148

The resistor 161 constructs the negative feedback circuit 8. A resistor for detecting a small current is used as a detecting resistor for controlling the switch circuit 163.

Figure 27A:
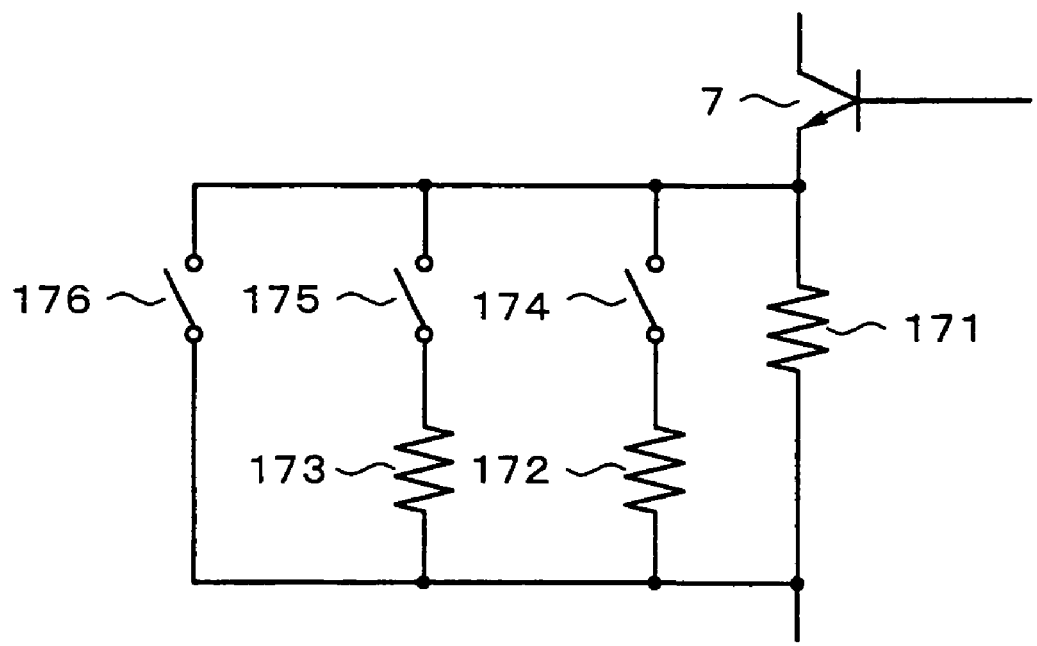
FIG. 27, consisting of FIGS. 27A and 27B, is a schematic diagram of an example of a negative feedback circuit which is used in the invention.

An example of the negative feedback circuit 8 will be described by using FIG. 27. FIG. 27A shows only the portion of the emitter feedback of the switching device 7. A resistor 171 is provided for the emitter of the transistor of the switching device 7. (A switch circuit 174 and a resistor 172), (a switch circuit 175 and a resistor 173), and (a switch circuit 176) are provided in parallel with the resistor 171, respectively.

Figure 27B:
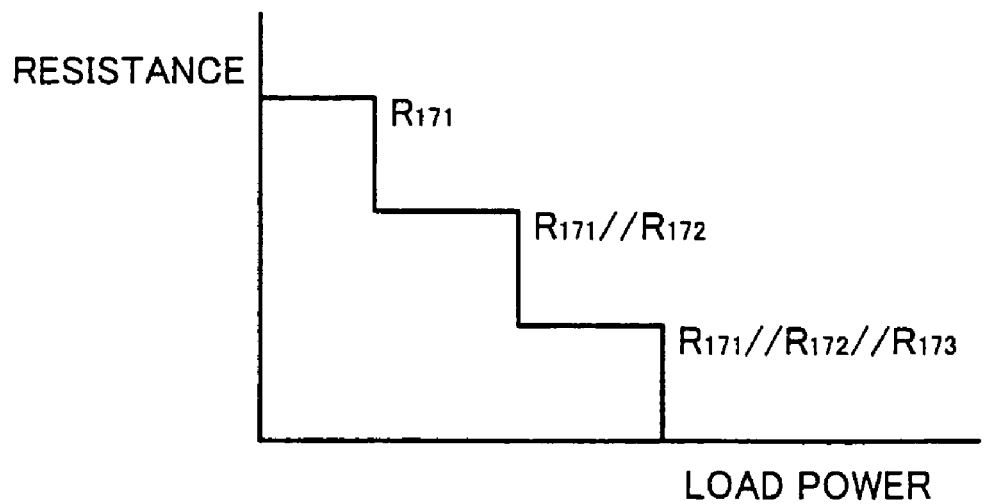

A resistance value at the time when the switch circuits 174, 175, and 176 are turned off and a load electric power at this time are shown by $R_{171}$ in FIG. 27B. A resistance value at the time when the switch circuit 174 is turned on and the switch circuits 175 and 176 are turned off and a load electric power at this time are shown by $R_{171}//R_{172}$ in FIG. 27B. A resistance value at the time when the switch circuits 174 and 175 are turned on and the switch circuit 176 is turned off and a load electric power at this time are shown by $R_{171}//R_{172}//R_{173}$ in FIG. 27B.

Figure 28:
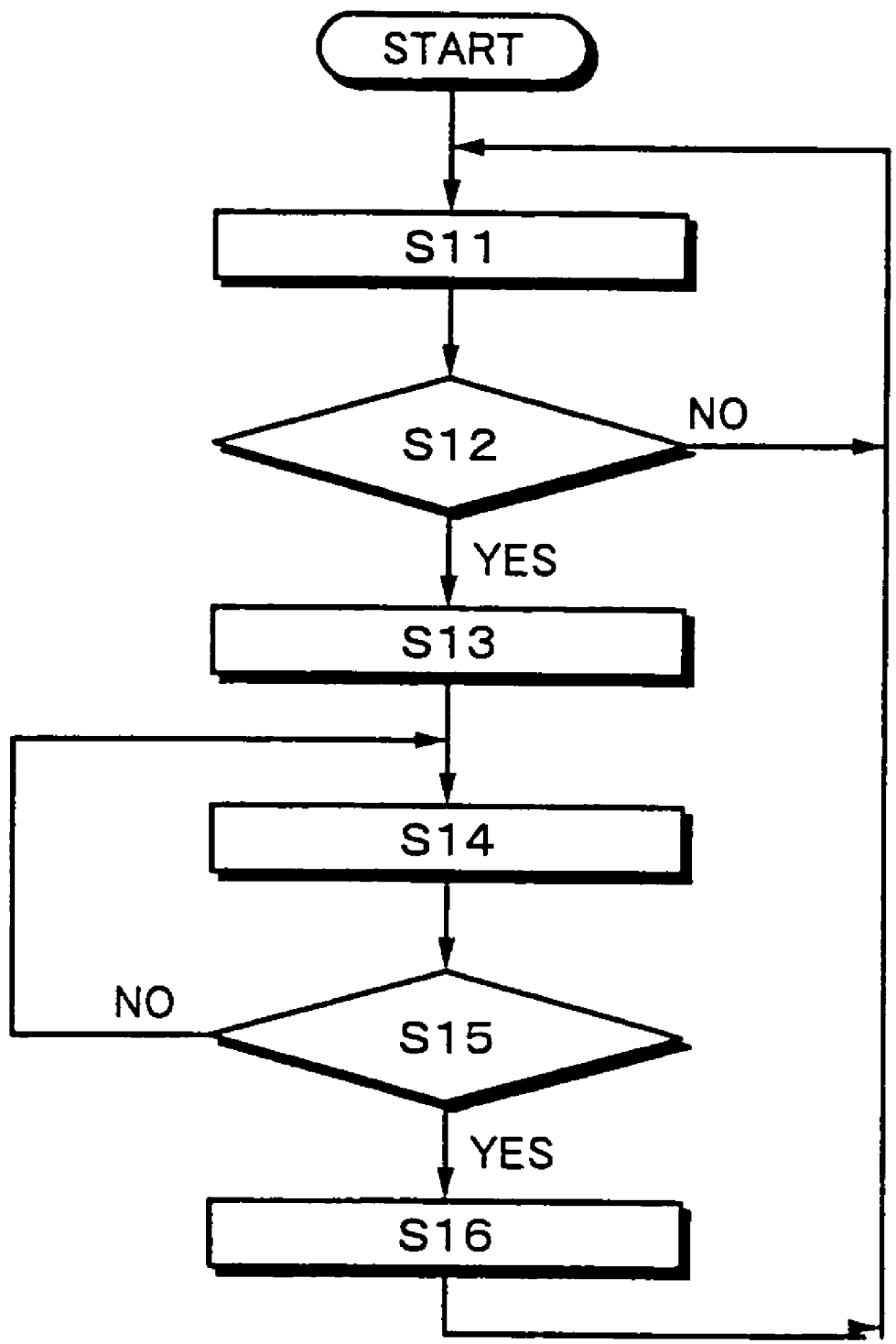
FIG. 28 is a flowchart for explaining control of the second embodiment to which the invention is applied.

An example of the control in the second embodiment will be described with reference to a flowchart of FIG. 28. In step S11, the operation of the switching power supply circuit, that is, the operation of the switching device 7 is started and the current flowing in the resistor 161 is detected. In step S12, whether the detected current is a predetermined current for setting the switch circuit 163 to the ON state or not is discriminated. If it is determined that the detected current is the predetermined current for setting the switch-circuit 163 to the ON state, a control routine advances to step S13. If it is determined that the detected current is the current which does not set the switch circuit 163 to the ON state, that is, the current which holds the OFF state, a control routine is returned to step S11. In step S13, the switch circuit 163 is turned on.

In step S14, the current flowing in the resistor 148 is detected. In step S15, whether the detected current is a predetermined current for setting the switch circuit 163 to the OFF state or not is discriminated. If it is determined that the detected current is the predetermined current for setting the switch circuit 163 to the OFF state, a control routine advances to step S16. If it is determined that the detected current is the current which does not set the switch circuit 163 to the OFF state, that is, the current which holds the ON state, a control routine is returned to step S14. In step S16, the switch circuit 163 is turned off.

Figure 29:
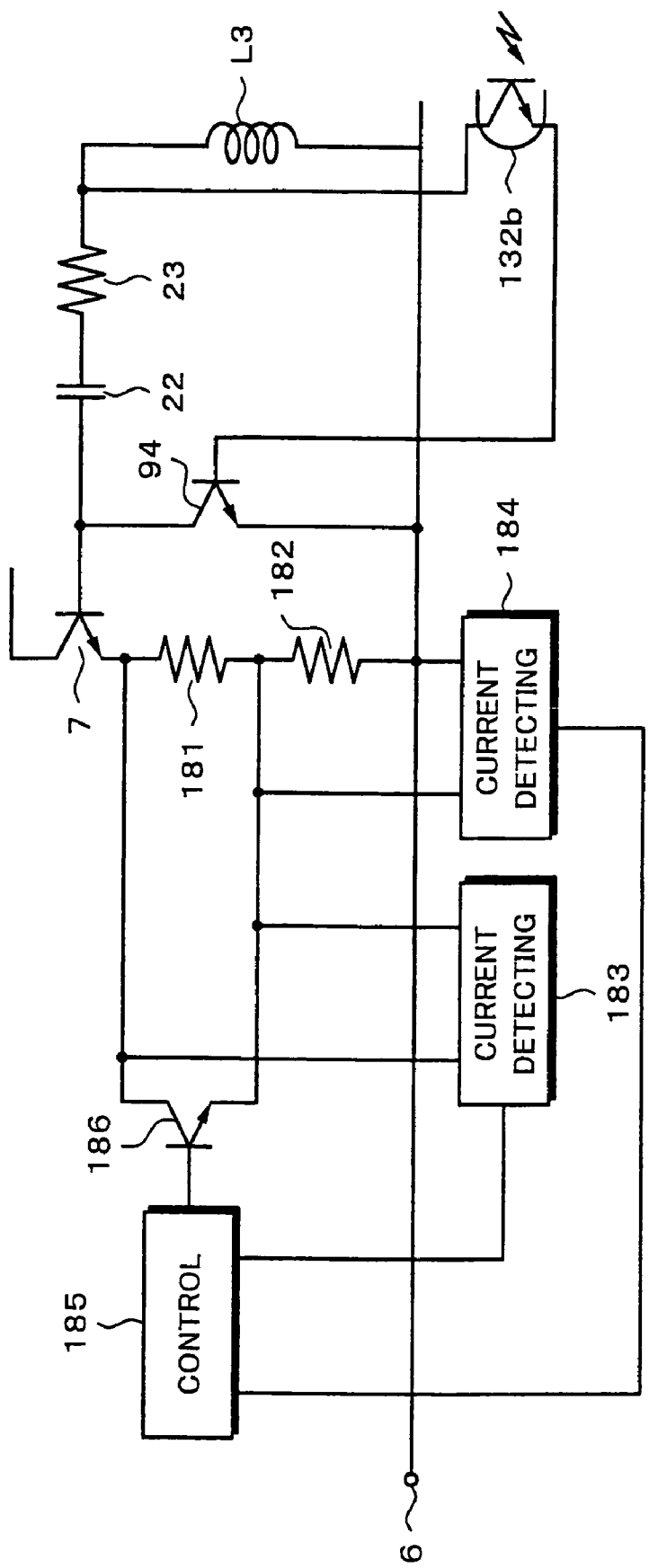
FIG. 29 is a circuit diagram of a third example of the second embodiment to which the invention is applied.
Figure 30:
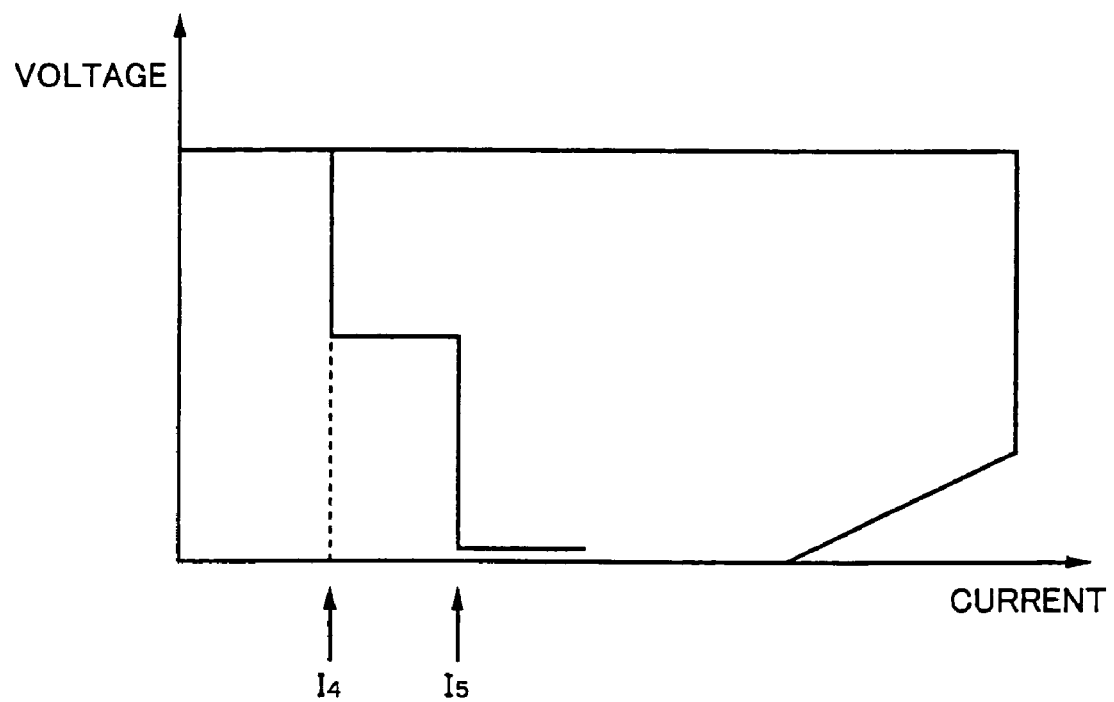
FIG. 30 is a characteristics diagram for explaining a third example of the second embodiment to which the invention is applied.

A third example of the second embodiment to which the invention is applied is shown in FIG. 29. FIG. 29 shows a portion from the switching device 7 to the terminal 6 via the feedback coil L3. Resistors 181 and 182 are serially provided between the emitter of the transistor of the switching device 7 and the terminal 6. The resistor 181 is provided between an emitter and a collector of an NPN-type transistor 186. A base of the transistor 186 is connected to a control circuit 185. A current flowing in the resistor 181 is detected by a current detecting circuit 183. When a current $I_4$ shown in FIG. 30 is detected by the current detecting circuit 183, a control signal is supplied from the control circuit 185 to the base of the transistor 186 so as to reduce an impedance of the transistor 186 to a low impedance. A current flowing in the resistor 182 is detected by a current detecting circuit 184. When a current $I_5$ shown in FIG. 30 is detected by the current detecting circuit 184, a control signal is supplied from the control circuit 185 to the base of the transistor 186 so as to turn on the transistor 186.

Figure 31:
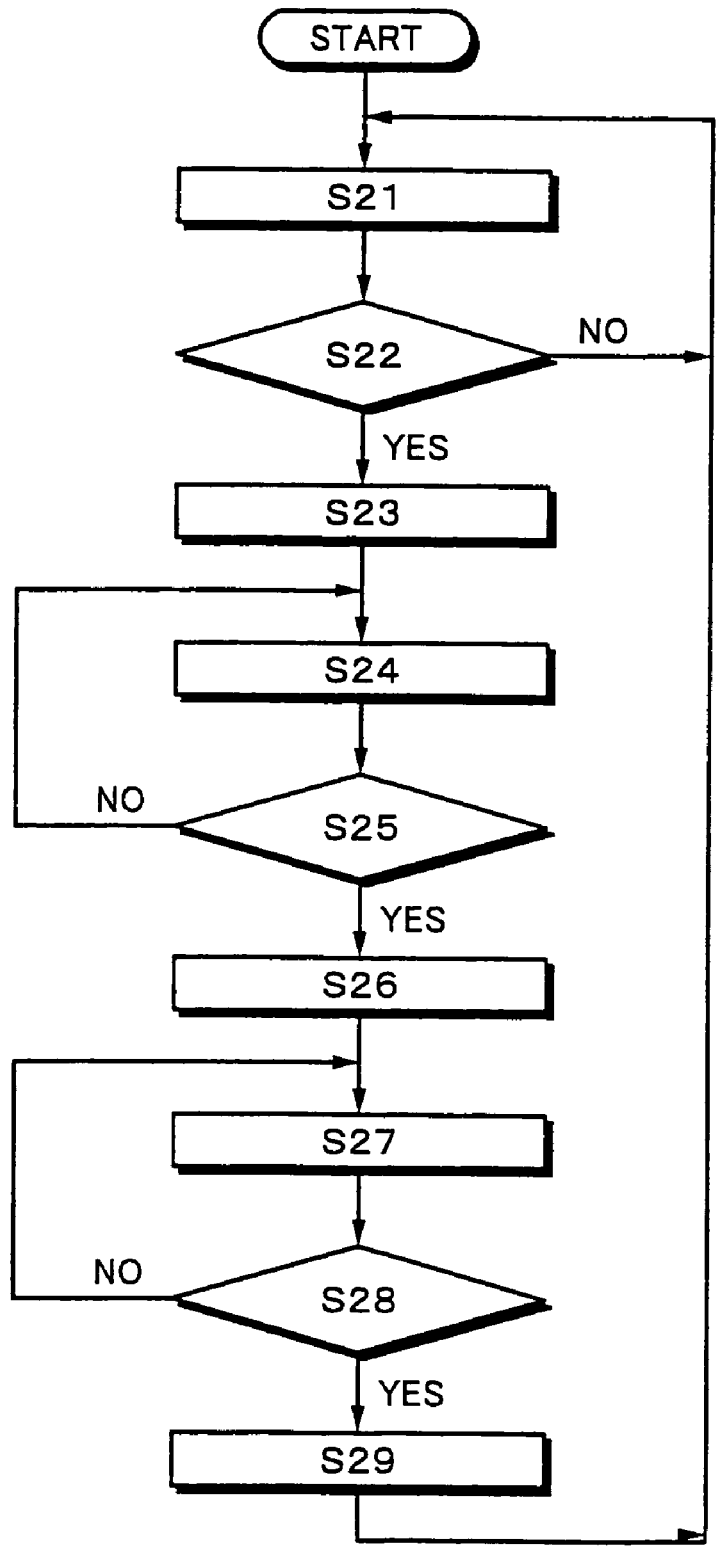
FIG. 31 is a flowchart for explaining the control of the second embodiment to which the invention is applied.

An example of the control of the second embodiment will be described with reference to a flowchart of FIG. 31. In step S21, the operation of the switching power supply circuit, that is, the operation of the switching device 7 is started and the current flowing in the resistor 181 is detected in the current detecting circuit 183. In step S22, whether the detected current is equal to or larger than a predetermined value, for example, the current $I_4$ shown in FIG. 30 or not is discriminated. If it is determined that the detected current is equal to or larger than the current $I_4$, a control routine advances to step S23. If it is determined that the detected current is less than the current $I_4$, a control routine is returned to step S21. In step S23, the control signal is supplied from the control circuit 185 so as to reduce the impedance of the transistor 186 to the low impedance.

In step S24, the current flowing in the resistor 182 is detected in the current detecting circuit 184. In step S25, whether the detected current is equal to or larger than a predetermined value, for example, the current $I_5$ shown in FIG. 30 or not is discriminated. If it is determined that the detected current is equal to or larger than the current $I_5$, a control routine advances to step S25. If it is determined that the detected current is less than the current $I_5$, a control routine is returned to step S24. In step S26, the transistor 186 is turned on.

In step S27, the current flowing in the resistor 181 is detected in the current detecting circuit 183. In step S28, whether the detected current is equal to or less than a predetermined value, for example, the current $I_4$ shown in FIG. 30 or not is discriminated. If it is determined that the detected current is equal to or less than the current $I_4$, a control routine advances to step S29. If it is determined that the detected current is less than the current $I_4$, a control routine is returned to step S27. In step S29, the control signal is supplied from the control circuit 185 so as to reduce the impedance of the transistor 186 to the low impedance. A control routine is returned to step S21.

Figure 32:
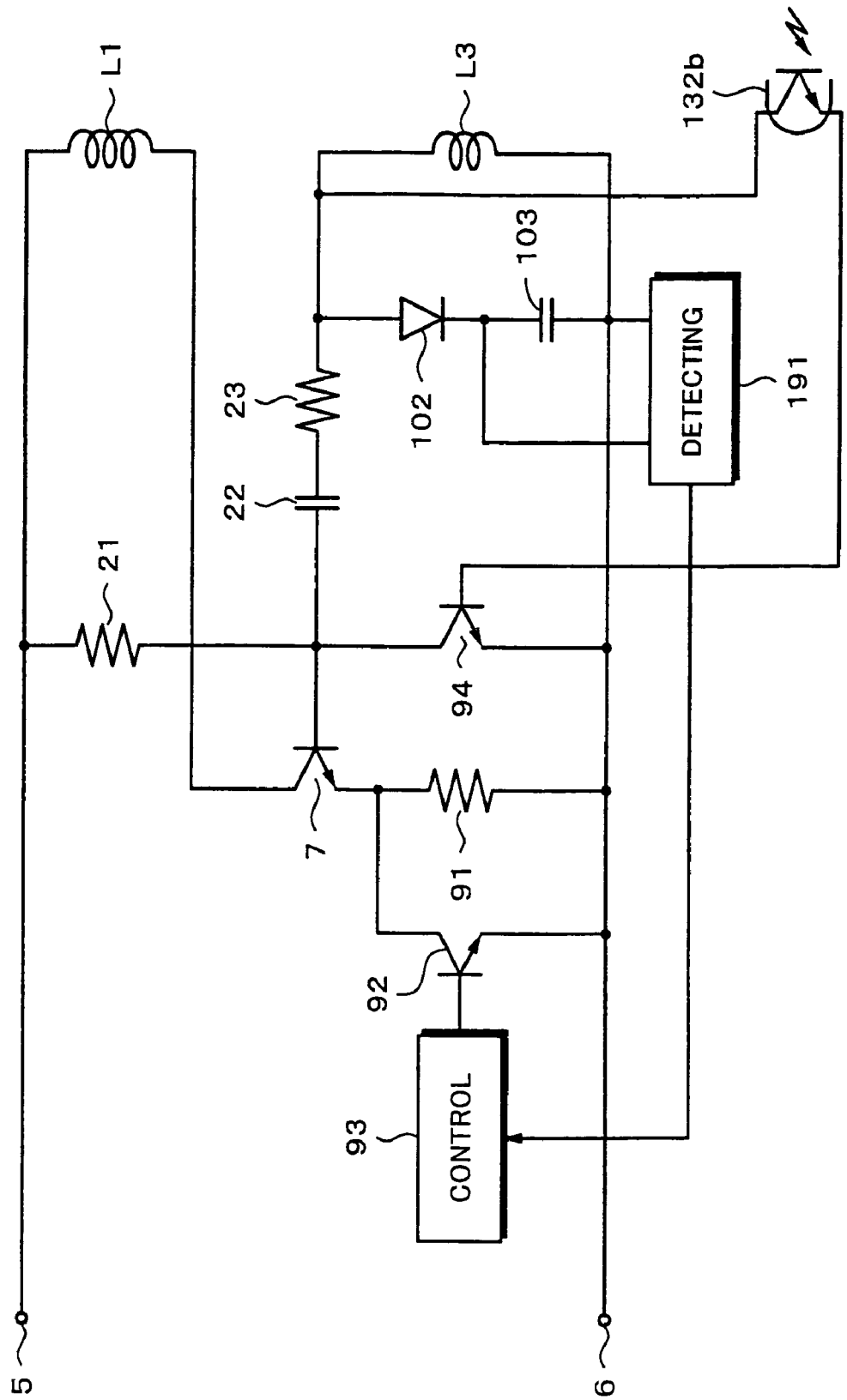
FIG. 32 is a circuit diagram of a first example of the third embodiment to which the invention is applied.

A first example of the third embodiment to which the invention is applied is shown in FIG. 32. In the third embodiment, a voltage and a current are detected from the tertiary coil L3, that is, the feedback coil L3 and a negative feedback is applied to the switching device 7 in accordance with the values of the detected voltage and current.

Figure 33:
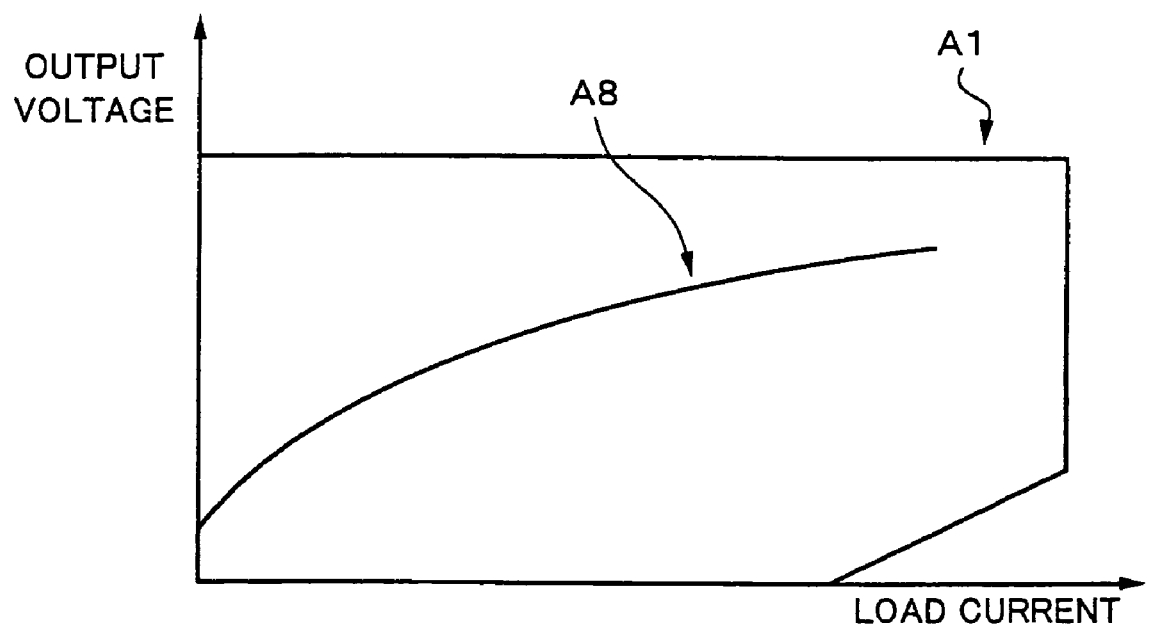
FIG. 33 is a characteristics diagram for explaining the third embodiment to which the invention is applied.

A detecting circuit 191 detects the voltage and the current from both ends of the capacitor 103. A signal is supplied to the control circuit 93 in accordance with the detected voltage and current. Characteristics of the voltage and the current of the feedback coil L3 are shown by characteristics A8 in FIG. 33.

Figure 34:
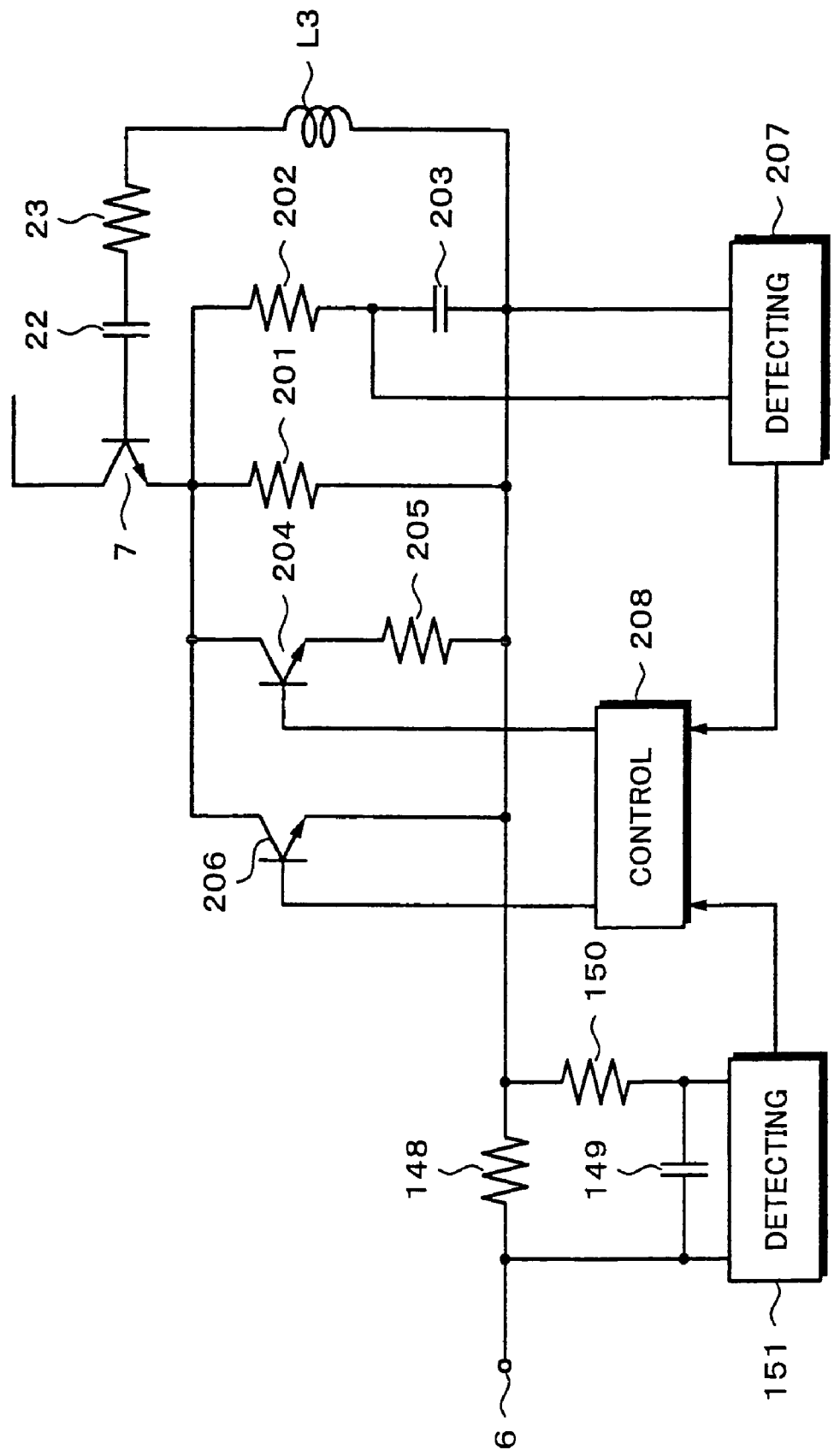
FIG. 34 is a circuit diagram of a second example of the third embodiment to which the invention is applied.

A second example of the third embodiment to which the invention is applied is shown in FIG. 34. FIG. 34 shows a portion from the switching device 7 to the terminal 6 via the feedback coil L3. Resistors 201 and 148 are serially provided between the emitter of the transistor of the switching device 7 and the terminal 6. (A resistor 202 and a capacitor 203), (an NPN-type transistor 204 and a resistor 205), and (an NPN-type transistor 206) are provided in parallel with the resistor 201. A detecting circuit 207 detects a voltage and a current from both ends of the capacitor 203. The resistors 201 and 205 are provided between an emitter and a collector of the transistor 204 and a control circuit 208 is connected to a base. An emitter of the transistor 206 is connected to the emitter of the transistor 204 via the resistor 205, a collector is connected to the collector of the transistor 204, and a base is connected to the control circuit 208.

Figure 35:
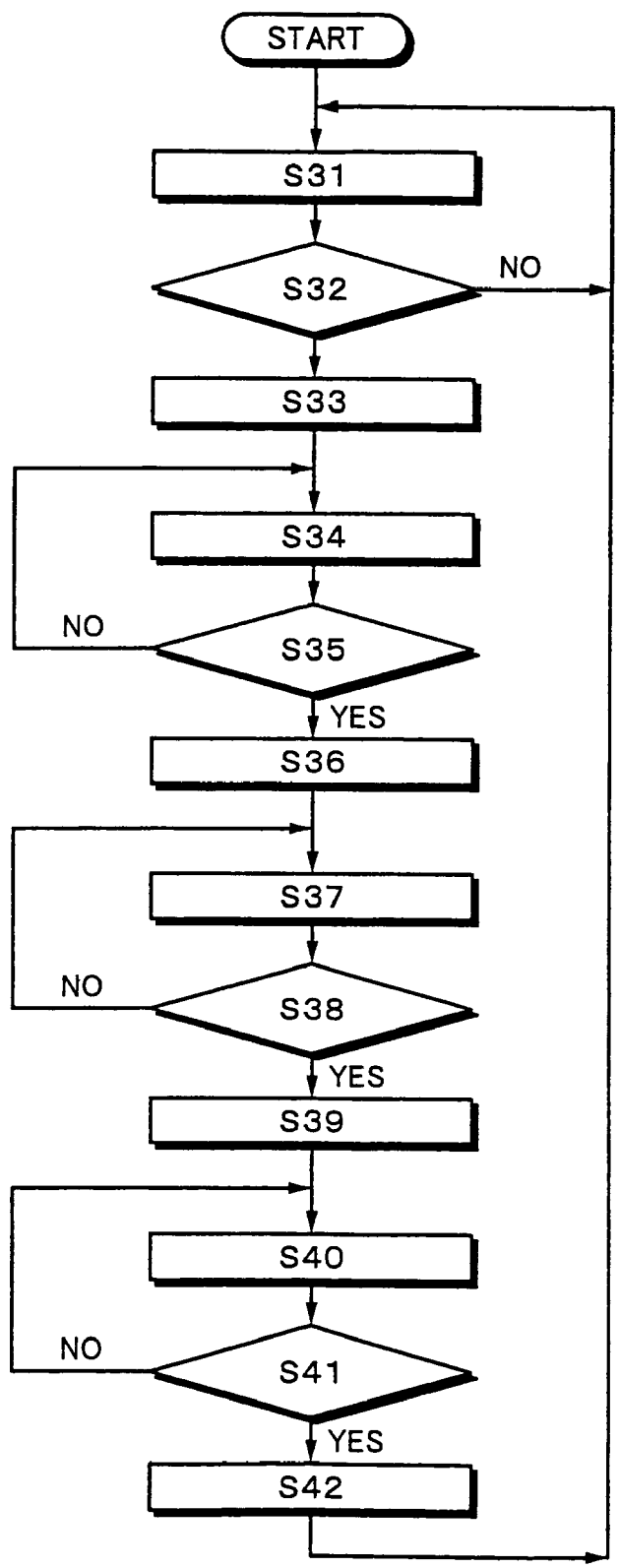
FIG. 35 is a flowchart for explaining control of the third embodiment to which the invention is applied.

An example of the control of the third embodiment will be described with reference to a flowchart of FIG. 35. In step S31, the operation of the switching power supply circuit, that is, the operation of the switching device 7 is started and the current flowing in the resistor 201 is detected in the current detecting circuit 207. In step S32, whether the detected current is equal to or larger than a predetermined value, for example, the current $I_5$ shown in FIG. 36 or not is discriminated. If it is determined that the detected current is equal to or larger than the current $I_5$, a control routine advances to step S33. If it is determined that the detected current is less than the current $I_5$, a control routine is returned to step S31. In step S33, the transistor 204 is turned on.

In step S34, the current flowing in the resistors 201 and 204 provided in parallel is detected in the current detecting circuit 207. In step S35, whether the detected current is equal to or larger than a predetermined value, for example, the current $I_6$ shown in FIG. 36 or not is discriminated. If it is determined that the detected current is equal to or larger than the current $I_6$, a control routine advances to step S36. If it is determined that the detected current is less than the current $I_6$, a control routine is returned to step S34. In step S36, the transistor 206 is turned on.

In step S37, a current flowing in the resistor 148 is detected in the current detecting circuit 151. In step S38, whether the detected current is a predetermined current to set the transistor 206 into the OFF state or not is discriminated. If it is determined that the detected current is the predetermined current to set the transistor 206 into the OFF state, a control routine advances to step S39. If it is determined that the detected current is the current which does not set the transistor 206 into the OFF state, that is, the current which holds the ON state, a control routine is returned to step S37. In step S39, the transistor 206 is turned off.

In step S40, a current flowing in the resistors 201 and 205 provided in parallel is detected in the current detecting circuit 207. In step S41, whether the detected current is a predetermined current to set the transistor 204 into the OFF state or not is discriminated. If it is determined that the detected current is the predetermined current to set the transistor 204 into the OFF state, a control routine advances to step S42. If it is determined that the detected current is the current which does not set the transistor 204 into the OFF state, that is, the current which holds the ON state, a control routine is returned to step S40. In step S42, the transistor 204 is turned off. A control routine is returned to step S31.

Figure 36:
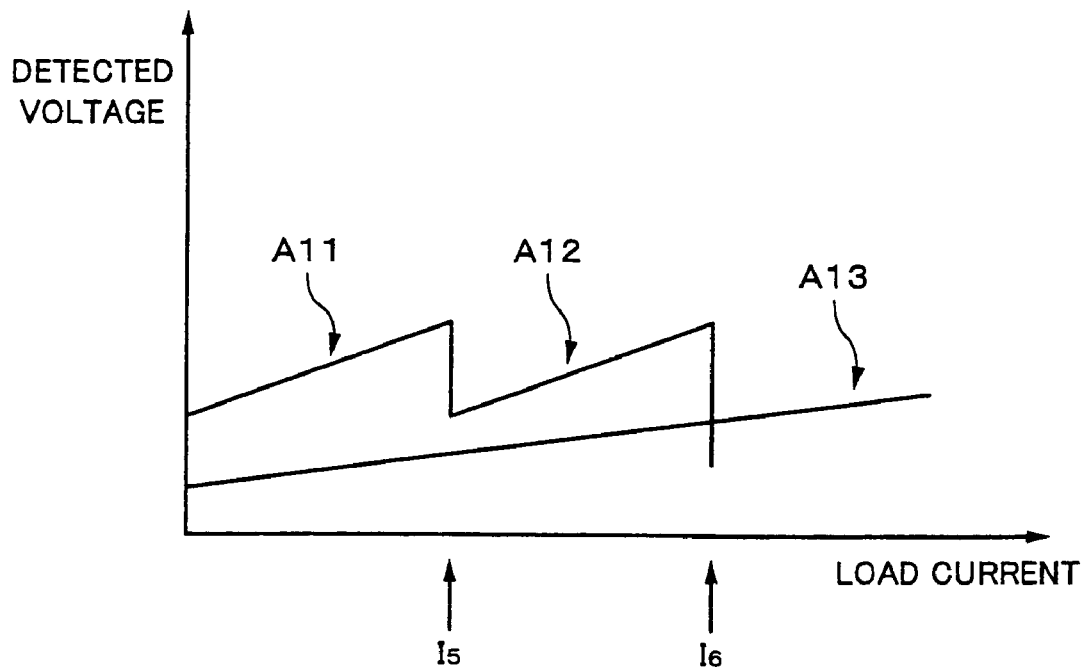
FIG. 36 is a characteristics diagram for explaining the third embodiment to which the invention is applied.

As an example of such characteristics, a characteristics diagram is shown in FIG. 36. When the transistors 204 and 206 are turned off, resistor 201× current and its locus is as shown by characteristics A11. When the transistor 204 is turned on and the transistor 206 is turned off, ((resistor 201· resistor 205)/(resistor 201+resistor 205))× current and its locus is as shown by characteristics A12. When the transistors 204 and 206 are turned on, resistor 148× current and its locus is as shown by characteristics A13.

Figure 37:
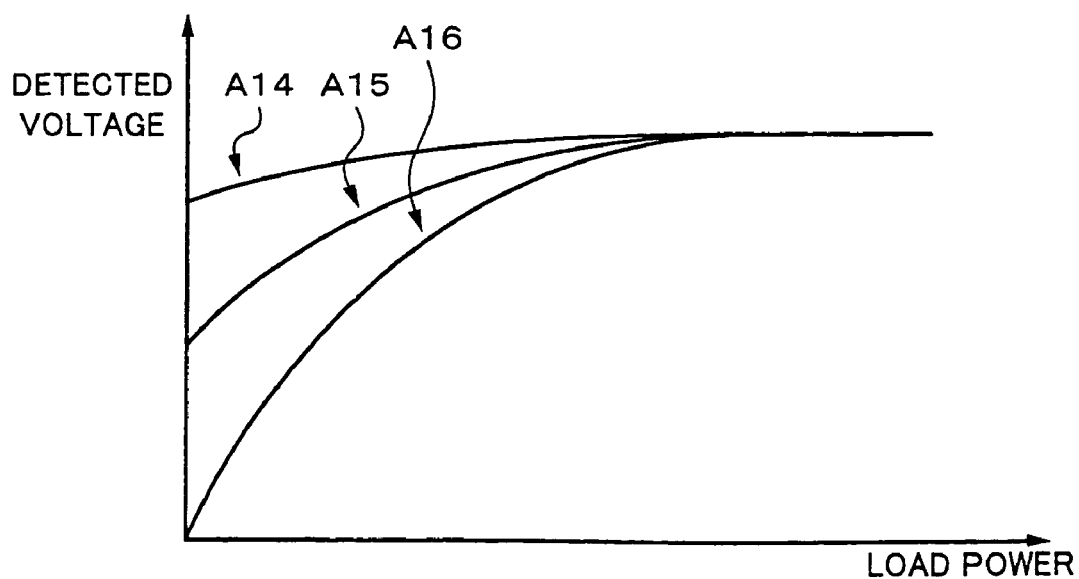
FIG. 37 is a characteristics diagram for explaining the third embodiment to which the invention is applied.

A relation between an electric power (load electric power) which is outputted from the switching power supply circuit due to the value of a negative feedback resistance that is formed from a synthetic resistance of the resistors 201 and 205 and a detected voltage is shown in FIG. 37. The negative feedback resistance is assumed to be R201. When the negative feedback resistance R201= 0, characteristics A14 are obtained. When the negative feedback resistance R201 is small, for example, when it is equal to about 200 Ω, that is, when the negative feedback ratio is small, characteristics A15 are obtained. When the negative feedback resistance R201 is large, for example, when it is equal to about 500 Ω, that is, when the negative feedback ratio is large, characteristics A16 are obtained.

Figure 38:
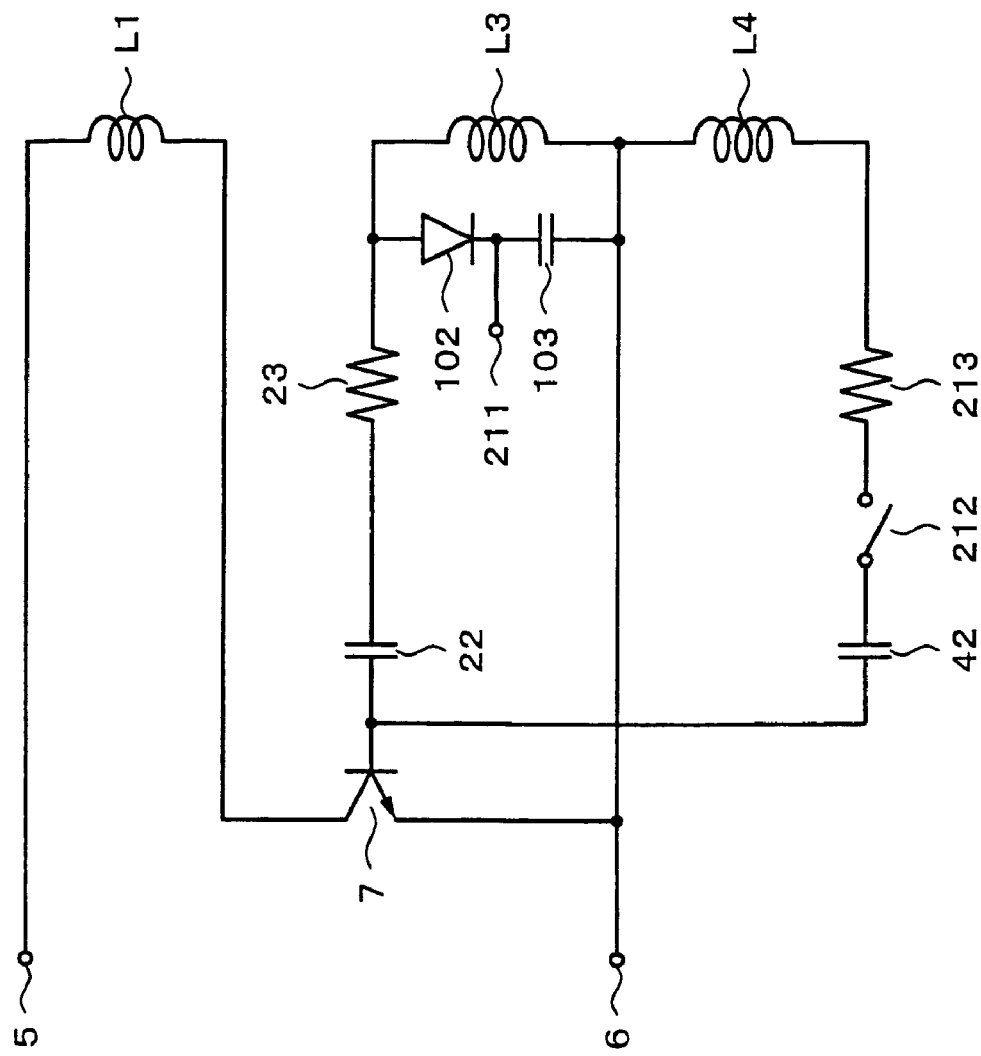
FIG. 38 is a circuit diagram of a third example of the third embodiment to which the invention is applied.

A third example of the third embodiment to which the invention is applied is shown in FIG. 38. FIG. 38 shows an example of a negative feedback circuit of the base feedback. The capacitor 42, a switch circuit 212, and a resistor 213 are serially provided between the base of the transistor of the switching device 7 and one end of the negative feedback coil L4. The other end of the negative feedback coil L4 is connected to the terminal 6. A signal obtained by inverting the signal of the feedback coil L3 by 180° can be extracted by the negative feedback coil L4. The extracted signal is supplied to the base of the transistor of the switching device 7 via the resistor 213 and the capacitor 42 when the switch circuit 212 is turned on. The negative feedback circuit is constructed by what is called a base feedback and the oscillation of the switching power supply circuit can be suppressed by controlling a value of an impedance of the resistor 213.

A terminal 211 is led out from a node of the cathode of the diode 211 and the capacitor 103. The terminal 211 is used for detecting the voltage and the current from the feedback coil L3 and applying a negative feedback to the switching device 7 in accordance with the values of the detected voltage and current.

Figure 39:
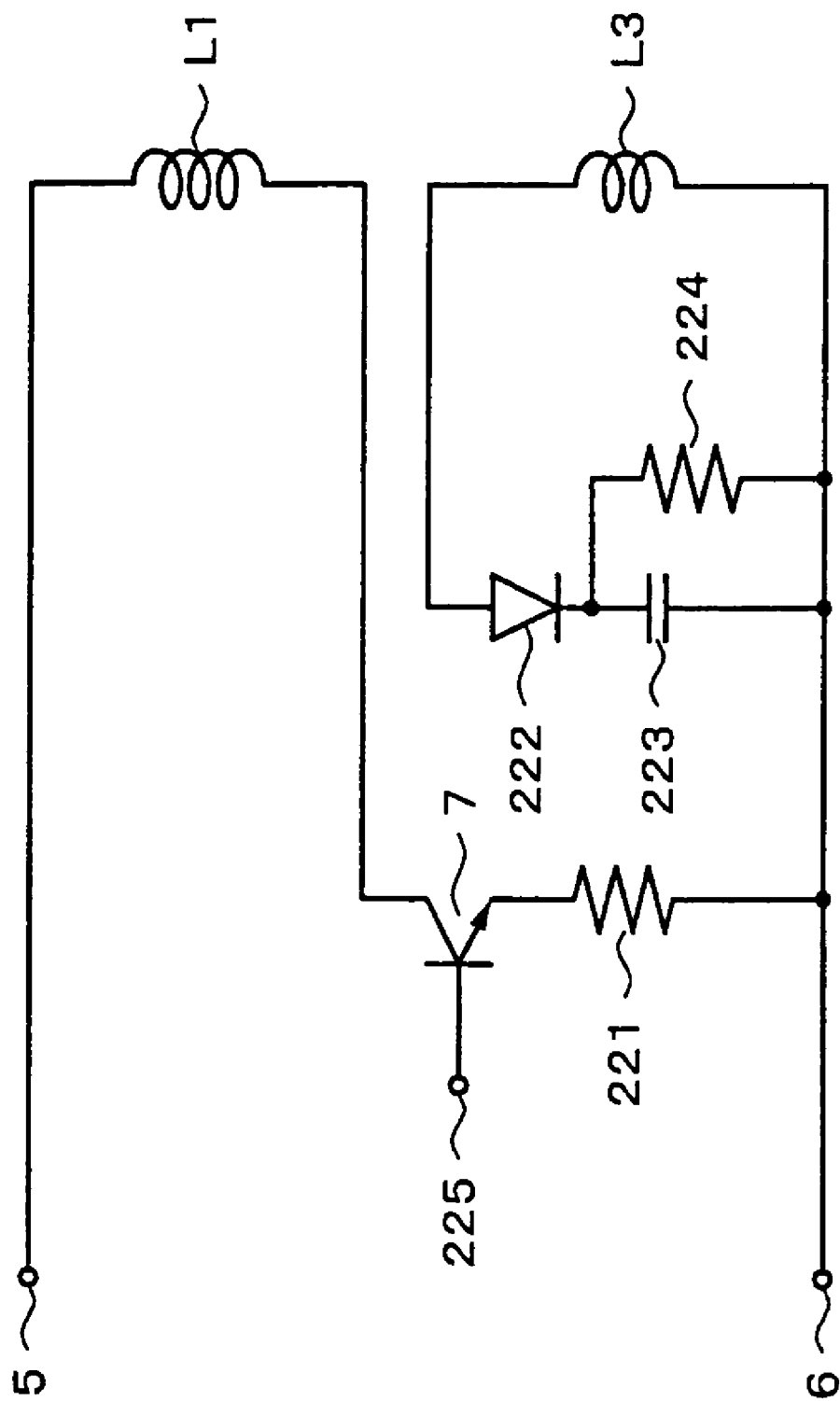
FIG. 39 is a circuit diagram of a fourth example of the third embodiment to which the invention is applied.

A fourth example of the third embodiment to which the invention is applied is shown in FIG. 39. A resistor 221 is provided between the emitter of the transistor of the switching device 7 and the terminal 6. An anode of a diode 222 is connected to one end of the negative feedback coil L3 and a capacitor 223 and a resistor 224 are provided in parallel between a cathode of the diode 222 and the terminal 6. A terminal 225 is led out from the base of the transistor of the switching device 7.

Figure 40:
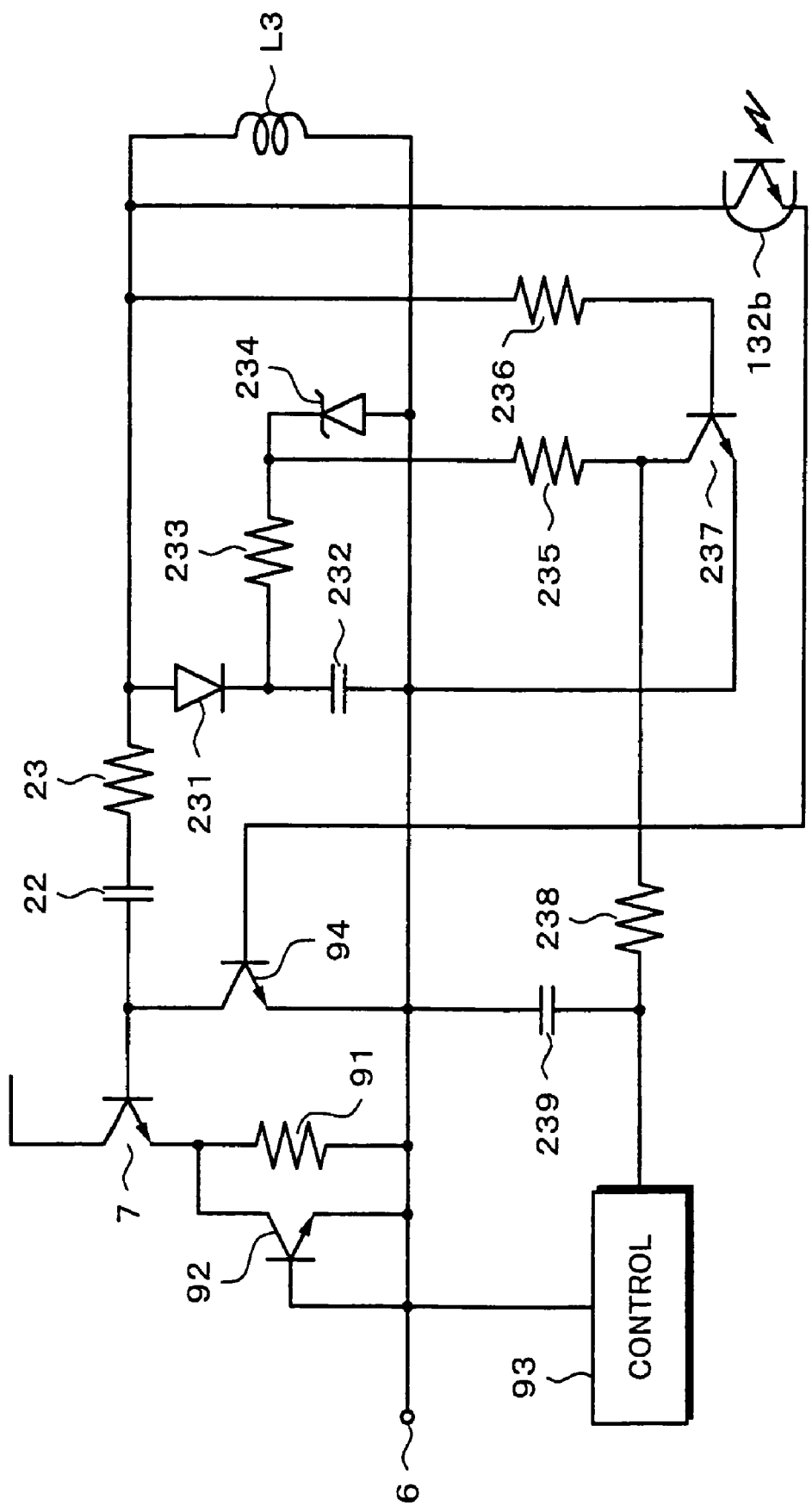
FIG. 40 is a circuit diagram of a first example of the fourth embodiment to which the invention is applied.

A first example of the fourth embodiment to which the invention is applied is shown in FIG. 40. According to the fourth embodiment, a width of pulse which is generated in the tertiary coil L3, that is, the feedback coil L3 is detected and a negative feedback is applied to the switching device 7 in accordance with the detected pulse width.

FIG. 40 shows a portion from the switching device 7 to the terminal 6 via the feedback coil L3. An anode of a diode 231 is connected to a node of the resistor 23 and the feedback coil L3 and a cathode is connected to the terminal 6 via a resistor 232. A resistor 233 is provided between the cathode of the diode 231 and a cathode of a Zener diode 234. An anode of the Zener diode 234 is connected to the terminal 6. A resistor 235 is provided between the cathode of the Zener diode 234 and a collector of an NPN-type transistor 237. An emitter of the transistor 237 is connected to the terminal 6 and a base is connected to one end of the feedback coil L3 via a resistor 236. A resistor 238 and a capacitor 239 are provided between the collector of the transistor 237 and the terminal 6. A node of the resistor 238 and the capacitor 239 is connected to the control circuit 93.

Figure 42:
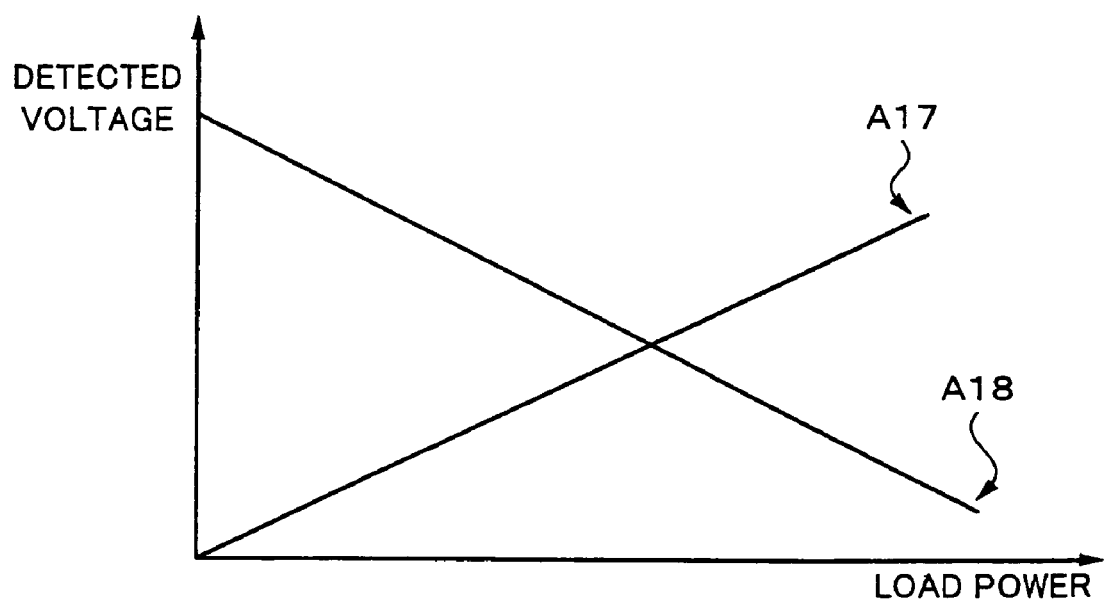
FIG. 42 is a characteristics diagram for explaining the fourth embodiment to which the invention is applied.

In the fourth embodiment, a pulse-like voltage is generated as shown in FIG. 41A by the Zener diode 234 which is used for stabilization. At this time, for example, a pulse width (duty ratio) shown in FIG. 41B is detected. The pulse width shown in FIG. 41B has an opposite phase as shown in characteristics A18 in FIG. 42. A pulse width of FIG. 41C can be also detected. The pulse width of FIG. 41C is opposite to that shown in FIG. 41B. The pulse width shown in FIG. 41C has the same phase as shown in characteristics A17 in FIG. 42.

Although the pulse-like voltages shown in FIGS. 41A and 41B which are obtained from the Zener diode 234 have been used in this example, the pulse-like voltages shown in FIGS. 41A and 41B which are obtained from the feedback transformer L3 can be also used. That is, a portion to obtain the pulse-like voltages is not a problem but it is sufficient if the pulse-like voltages shown in FIGS. 41A and 41B can be obtained.

Figure 43:
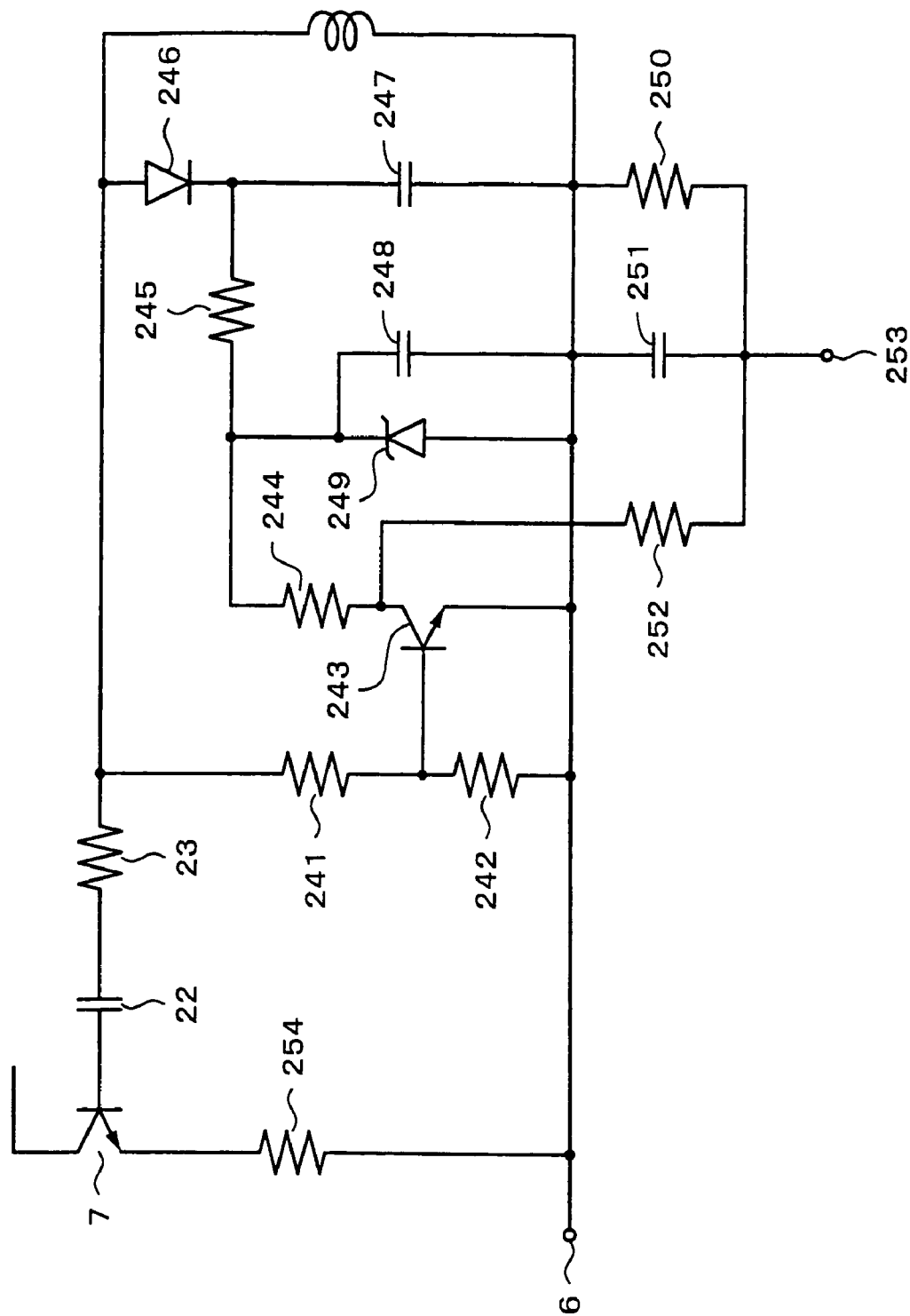
FIG. 43 is a circuit diagram of a second example of the fourth embodiment to which the invention is applied.

A second example of the fourth embodiment to which the invention is applied is shown in FIG. 43. FIG. 43 shows a portion from the switching device 7 to the terminal 6 via the feedback coil L3. A resistor 254 is provided between the emitter of the transistor of the switching device 7 and the terminal 6. Resistors 241 and 242 are serially provided between a node of the resistor 23 and the feedback coil L3 and the terminal 6. A base of an NPN-type transistor 243 is connected to a node of the resistors 241 and 242. An emitter of the transistor 243 is connected to the terminal 6 and a collector is connected to a cathode of a Zener diode 246 via resistors 244 and 245. An anode of the Zener diode 246 is connected to a node of the resistor 23 and the feedback coil L3. A capacitor 247 is provided between the cathode of the Zener diode 246 and the terminal 6. A cathode of a Zener diode 249 is connected to a node of the resistors 244 and 245 and an anode is connected to the terminal 6. A capacitor 248 is provided in parallel with the Zener diode 249.

Resistors 250 and 252 are serially provided between the collector of the transistor 243 and the terminal 6. A capacitor 251 is provided between a node of the resistors 250 and 252 and the terminal 6. A terminal 253 is led out from the node of the resistors 250 and 252.

A feature of each of the foregoing embodiments will be described.

According to the first embodiment, the detection of the load connected to the secondary side, that is, the direction in which the current flowing in the load increases and the detection of the load, that is, the direction in which the current flowing in the load decreases can be made.

According to the second embodiment, the detection of the direction in which the current increases is made from the negative feedback resistance and the detection of the direction in which the current decreases is made from a small resistance, for example, the resistance 148.

The third embodiment is suitable for the detection of the direction in which the current increases when the negative feedback resistance is large.

According to the fourth embodiment, the detection of the direction in which the load (current) increases and the detection of the direction in which the load decreases, that is, the current decreases can be made.

By combining those embodiments, control of higher precision can be made. For example, the high-precision control can be made by combining the first and second embodiments, the first and third embodiments, the second and third embodiments, the second and fourth embodiments, and the third and fourth embodiments. Three embodiments can be combined or all of the four embodiments can be also combined.

Although the transistor has been used as an example of the switching device in the embodiments, the switching device is not limited to it and similar effects can be realized by using a field effect transistor. Similar effects can be obtained whatever device is used so long as a similar switching operation can be performed.

Although the negative feedback circuit has been provided for the self-excited switching power supply in the embodiments, the negative feedback circuit can be provided for the separately-excited switching power supply.

According to the invention, the negative feedback circuit is provided on the primary side of the self-excited switching power supply circuit and only when the connected load is smaller than the predetermined value, the negative feedback resistance can be varied so as to make the load circuit operative, so that the stable output can be supplied. Even if parts of large variations (switching device, transformer, capacitor, and the like) are used, the negative feedback resistance can be varied, so that the stable output can be supplied. Therefore, the costs can be reduced.

According to the invention, the negative feedback circuit is provided on the primary side of the self-excited switching power supply circuit and only when the connected load is smaller than the predetermined value, the negative feedback resistance is varied so as to make the load circuit operative. Thus, even if the apparatus is designed so as to execute the high-efficiency operation at the maximum load or even if the capacity of the load fluctuates, the voltage and current can be stably outputted. Further, the oscillation which has conventionally occurred can be suppressed.

What is claimed is:

1. A switching power supply apparatus for supplying a voltage and a current to a connected load, comprising:
   a transformer constructed by at least primary, secondary, and feedback coils;
   detecting means, having a first current detecting circuit and a second current detecting circuit, for detecting a voltage and/or a load current;
   a switching device for controlling said voltage and/or load current, said switching device having a first resistor and a second resistor in series circuit with said switching device;
   negative feedback means connected in series with said switching device and primary coil of said transformer and for supplying a negative feedback to said switching device;
   a switch circuit provided in parallel with said first resistor;
   control means, in circuit with said switch circuit, for controlling an ON/OFF operation of said switch circuit, and
   an operation circuit responsive to said first current detecting circuit to turn on said switch circuit through said control means, and a canceling circuit responsive to said second current detecting circuit to turn off said switch circuit through said control means,
   wherein said control means makes said negative feedback means operative when said detecting means detects the load voltage and/or the load current in which it is possible to determine that a value of the load is equal to or less than a predetermined value.

2. The switching power supply apparatus as set forth in claim 1, further including a first integrating circuit in parallel to said first resistor, and a second integrating circuit in parallel to said second resistor.

* * * * *